(12) United States Patent
Zajkowski et al.

(10) Patent No.: US 8,019,084 B1
(45) Date of Patent: *Sep. 13, 2011

(54) AUTOMATED BANKING MACHINE REMOTE KEY LOAD SYSTEM AND METHOD

(75) Inventors: Timothy Zajkowski, Uniontown, OH (US); Anne Doland, Uniontown, OH (US); Mark D. Smith, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 758 days.

This patent is subject to a terminal disclaimer.

(21) Appl. No.: 11/981,169

(22) Filed: Oct. 31, 2007

Related U.S. Application Data

(62) Division of application No. 11/645,423, filed on Dec. 26, 2006, now Pat. No. 7,366,903, which is a division of application No. 10/126,728, filed on Apr. 19, 2002, now Pat. No. 7,159,114.

(60) Provisional application No. 60/285,724, filed on Apr. 23, 2001.

(51) Int. Cl.
*H04L 9/08* (2006.01)

(52) U.S. Cl. ............ 380/278; 380/30; 380/44; 713/156; 713/168; 713/171; 705/64; 705/71; 235/379

(58) Field of Classification Search .................. None
See application file for complete search history.

(56) References Cited

U.S. PATENT DOCUMENTS

| | | | |
|---|---|---|---|
| 4,578,530 A | 3/1986 | Zeidler | |
| 4,605,820 A | 8/1986 | Campbell, Jr. | |
| 4,659,877 A | 4/1987 | Dorsey et al. | |
| 4,918,728 A | 4/1990 | Matyas et al. | |
| 4,933,971 A | * 6/1990 | Bestock et al. | 380/44 |
| 4,941,176 A | 7/1990 | Matyas et al. | |
| 4,972,472 A | 11/1990 | Brown et al. | |
| 4,988,849 A | 1/1991 | Sasaki et al. | |
| 5,128,996 A | 7/1992 | Rosenow et al. | |
| 5,142,578 A | 8/1992 | Matyas et al. | |

(Continued)

FOREIGN PATENT DOCUMENTS

EP    0138320 A2    4/1985

(Continued)

OTHER PUBLICATIONS

"NCR Holistic Security: ATMIA ATM Security Practice Winner 2003", Oct. 27, 2003, Business Wire, pp. 1-2.*

(Continued)

*Primary Examiner* — Eleni A Shiferaw
*Assistant Examiner* — Shewaye Gelagay
(74) *Attorney, Agent, or Firm* — Christopher L. Parmelee; Ralph E. Jocke; Walker & Jocke

(57) ABSTRACT

A card activated cash dispensing automated banking machine is provided that is operative to send a message to a host banking system, which message includes data representative of a request to transfer an encrypted terminal master key from the host banking system to the automated banking machine. A processor in an encrypting pin pad (EPP) in the automated banking machine is operative to decrypt a received encrypted terminal master key using an asymmetric encryption algorithm with a first private asymmetric key previously stored in the EPP. The EPP is operative to store the terminal master key in the EPP for use with decrypting at least one further key received from the host banking system.

8 Claims, 15 Drawing Sheets

U.S. PATENT DOCUMENTS

| | | | |
|---|---|---|---|
| 5,214,698 A | 5/1993 | Smith et al. | |
| 5,228,084 A | 7/1993 | Johnson et al. | |
| 5,351,296 A | 9/1994 | Sullivan | |
| 5,384,850 A | 1/1995 | Johnson et al. | |
| 5,428,684 A | 6/1995 | Akiyama et al. | |
| 5,517,567 A | 5/1996 | Epstein | |
| 5,539,825 A | 7/1996 | Akiyama et al. | |
| 5,539,828 A | 7/1996 | Davis | |
| 5,613,012 A | 3/1997 | Hoffman et al. | |
| 5,745,576 A | 4/1998 | Abraham et al. | |
| 5,774,552 A | 6/1998 | Grimmer | |
| 5,787,403 A | 7/1998 | Randle | |
| 5,809,143 A | 9/1998 | Hughes | |
| 5,926,548 A | 7/1999 | Okamoto | |
| 5,982,445 A | 11/1999 | Eyer et al. | |
| 6,041,317 A | 3/2000 | Brookner | |
| 6,044,462 A | 3/2000 | Zubeldia et al. | |
| 6,085,177 A | 7/2000 | Semple et al. | |
| 6,098,053 A | 8/2000 | Slater | |
| 6,115,816 A | 9/2000 | Davis | |
| 6,212,280 B1 | 4/2001 | Howard, Jr. et al. | |
| 6,226,618 B1 | 5/2001 | Downs et al. | |
| 6,286,099 B1 | 9/2001 | Kramer | |
| 6,308,887 B1 * | 10/2001 | Korman et al. | 235/379 |
| 6,370,249 B1 | 4/2002 | Van Oorschot | |
| 6,396,928 B1 | 5/2002 | Zheng | |
| 6,442,690 B1 * | 8/2002 | Howard et al. | 713/175 |
| 6,539,361 B1 | 3/2003 | Richards et al. | |
| 6,539,364 B2 | 3/2003 | Moribatake et al. | |
| 6,594,758 B1 | 7/2003 | Okui | |
| 6,606,387 B1 | 8/2003 | Abraham | |
| 6,705,517 B1 | 3/2004 | Zajkowski et al. | |
| 6,788,788 B1 | 9/2004 | Kasahara et al. | |
| 6,804,662 B1 | 10/2004 | Annau et al. | |
| 6,848,050 B1 | 1/2005 | Merman et al. | |
| 6,853,988 B1 | 2/2005 | Dickinson et al. | |
| 6,854,056 B1 | 2/2005 | Benantar et al. | |
| 6,892,301 B1 | 5/2005 | Hansmann et al. | |
| 6,934,838 B1 | 8/2005 | Boyce et al. | |
| 6,948,070 B1 * | 9/2005 | Ginter et al. | 713/193 |
| 7,000,829 B1 | 2/2006 | Harris et al. | |
| 7,110,986 B1 | 9/2006 | Zajkowski et al. | |
| 7,159,114 B1 | 1/2007 | Zajkowski et al. | |
| 2001/0026619 A1 | 10/2001 | Howard et al. | |
| 2001/0049667 A1 | 12/2001 | Moribatake et al. | |
| 2002/0062440 A1 | 5/2002 | Akama | |
| 2002/0184492 A1 | 12/2002 | Hori et al. | |

FOREIGN PATENT DOCUMENTS

| | | |
|---|---|---|
| EP | 1096446 A2 | 5/2001 |

OTHER PUBLICATIONS

"Triple DES: Options for Compliance" 2003, ATMmarketplace.com Guide, pp. 1-40.*

"Effective Encryption key Management Practice", Jul. 2003, pp. 1-23.*

"Diebold Adds Two new Cash Dispensers for Growing Retail Market" Apr. 22, 1998, Diebold Inc., pp. 1-2.*

"NCR Holistic Security: ATMIA ATM Security Best Practice Winner 2003", Oct. 27, 2003, Business Wire Via Dialog Text Search, p. 1-2.

"Triple DES: Options for Compliance", 2003, ATMmarketplace.com Guide p. 1-40.

"Effective Encryption Key Management Practices", Jul. 2003, K3DES LLC, p. 1-23.

ISO/IEC 11770-3 Information Technology—Security Techniques—Key Management—Part 3:, 1999.

Diebold Adds Two New Cash Dispensers for Growing Retail Market, Apr. 22, 1998, PR Newswire, New York, p. 1.

Kenneth Kiesnoski, E-Banking Provider Creates 'Financial Hub', Jan. 2000, Bank Systems & Technology, IT Spotlight p. 50.

PKCS #10 v 1.7: Certificatuin Request Syntax Standard, May 26, 2000, RSA Laboratories.

PKCS # 7: Cryptographic Message Syntax Standard, Nov. 1, 1993, RSA Laboratories, Version 1.5.

Bruce Schneier, Applied Cryptography, 1996, John Wiley & Sons, Inc., Second Edition, 30, 31 and 52.

Galvin et al., Security Miltiparts for MIME: Multipart/Signed and Multipart/Encrypted, Oct. 1995, p. 4.

Bruce Schneier Applied Cryptography Protocols, Algorithms, and Source Code in C, 1996; Katherine Schowalter, second edition.

Forcht et al., "Security Issues and Concerns with the Internet", Internet Research v5n3, pp. 23-31, 1995, ISSN: 1066-2243.

"Contemporary Cryptology: The Science of Information Integrity" by Gustavus J. Simmons (p. 27, section 3.3, and p. 192, section 2.4), 1992.

* cited by examiner

Unsolicited Status Message

| DESCRIPTION | CODE | NUMBER OF CHARACTERS |
|---|---|---|
| Protocol Dependent Header | | VAR |
| Solicited/Unsolicited ID | '1' | 1 |
| Message Identifier | '2' | 1 |
| Field Separator (FS) | :1C | 1 |
| Logical Unit Number (LUNO) | — | 3 or 9 |
| Field Separator (FS) | :1C | 1 |
| Field Separator (FS) | :1C | 1 |
| Status Source | — | 1 |
| Status | — | VAR |
| Field Separator (FS) | [:1C] | 1 |
| *i* Series/MDS Status | [—] | VAR |
| Field Separator (FS) | [:1C] | 1 |
| Maintenance Mode Log | [—] | VAR |
| Field Separator | [:1C] | 1 [1] |
| Buffers to Follow ID | [9] | 1 [1] |
| Buffer ID | [—] | 3 [1] |
| Buffer Data | [—] | VAR [1] |
| Group Separator (GS) | [:1D] | 1 [1] |
| Buffer ID | [—] | 3 [1] |
| Buffer Data | [—] | VAR [1] |
| Protocol Dependent Trailer | VAR | VAR |

FIG. 7

Write Command VII Message — 308

| DESCRIPTION | CODE | NUMBER OF CHARACTERS |
|---|---|---|
| Protocol Dependent Header | | VAR |
| Write Command Identifier | '3' | 1 |
| Response Flag | [X] | 1 |
| Field Separator (FS) | :1C | 1 |
| Logical Unit Number (LUNO) | [X] | 3 |
| Field Separator (FS) | :1C | 1 |
| Message Sequence Number | [X] | 3 |
| Field Separator (FS) | :1C | 1 |
| Write Identifier (Encryption Key Change) | '3' | 1 |
| Key Change — 370 | [–] | 1 |
| Field Separator (FS) | :1C | 1 |
| New Key Data — 372 | [–] | VAR |
| Protocol Dependent Trailer | | VAR |

FIG. 8

Solicited Status Message

| DESCRIPTION | CODE | NUMBER OF CHARACTERS |
|---|---|---|
| Protocol Dependent Header | VAR | Var |
| Solicited/Unsolicited ID | '2' | 1 |
| Message Identifier | '2' | 1 |
| Field Separator (FS) | :1C | 1 |
| Logical Unit Number (LUNO) | — | 3 or 9 |
| Field Separator (FS) | :1C | 1 |
| Message Sequence Number | [—] | 8 |
| Field Separator (FS) | :1C | 1 |
| Status Descriptor | — | 1 |
| Field Separator (FS) | :1C | 1 |
| Device Identifier (DID) | [—] | 1 |
| Status | [—] | VAR |
| Group Separator (GS) | :1D | 1 [1] |
| Device Identifier (DID) | [—] | 1 [1] |
| Status | [—] | VAR [1] |
| Field Separator (FS) | :1C | 1 [2] |
| Amount of coins dispensed | [—] | 3 [2] |
| Field Separator (FS) | :1C | 1 [3] |
| MDS Status | [—] | VAR [3] |
| Field Separator | [—] | 1 [4] |
| Buffers to Follow ID | [9] | 1 [4] |
| Buffer ID | [—] | 3 [4] |
| Buffer Data | [—] | VAR [4] |
| Group Separator (GS) | :1D | 1 [4] |
| Buffer ID | [—] | 3 [4] |
| Buffer Data | [—] | VAR [4] |
| Field Separator (FS) | :1C | 1 [5] |
| Rollover 1 Count | [—] | 3 [5] |
| Rollover 2 Count | [—] | 3 [5] |
| Rollover 3 Count | [—] | 3 [5] |
| Rollover 4 Count | [—] | 3 [5] |
| Protocol Dependent Trailer | VAR | VAR |

Operational Command Message

| DESCRIPTION | CODE | NUMBER OF CHARACTERS |
|---|---|---|
| Protocol Dependent Header. | | VAR |
| Operational Command Identifier | '1' | 1 |
| Response Flag | [X] | 1 |
| Field Separator (FS) | :1C | 1 |
| Logical Unit Number (LUNO) | [X] | 3 |
| Field Separator (FS) | :1C | 1 |
| Message Sequence Number | [X] | 3 |
| Field Separator (FS) | :1C | 1 |
| Command Code | — | 1 |
| Data Field | [–] | VAR |
| Field Separator (FS) | [:1C][1] | 1 |
| Status Flag | [–][1] | 1 |
| Device Name | [–][1][2] | 4 |
| Protocol Dependent Trailer | | VAR |

AUTOMATED BANKING MACHINE REMOTE KEY LOAD SYSTEM AND METHOD

CROSS REFERENCE TO RELATED APPLICATIONS

This application is a divisional of U.S. patent application Ser. No. 11/645,423 filed Dec. 26, 2006, which is a divisional application of U.S. patent application Ser. No. 10/126,728 filed Apr. 19, 2002 (now U.S. Pat. No. 7,159,114) which claims benefit pursuant to 35 U.S.C. §119(e) of 60/285,724 filed Apr. 23, 2001.

TECHNICAL FIELD

The technical field appears to substantially correspond to USPTO class 235 under one or more of subclasses 375, 379, 380, 382, and 449. An embodiment relates to card activated cash dispensing automated banking machines associated with a banking system. Specifically this invention relates to an apparatus and method of configuring a card activated cash dispensing automated banking machine associated with a banking system.

BACKGROUND ART

Automated banking machines are well known. A common type of automated banking machine used by consumers is an automated teller machine ("ATM"). ATMs enable customers to carry out banking transactions. Common banking transactions that may be carried out with ATMs include the dispensing of cash, the making of deposits, the transfer of funds between accounts, the payment of bills and account balance inquiries. The types of banking transactions a customer can carry out are determined by capabilities of the particular banking machine and the programming of the institution operating the machine. Other types of automated banking machines may allow customers to charge against accounts or to transfer funds. Other types of automated banking machines may print or dispense items of value such as coupons, tickets, wagering slips, vouchers, checks, food stamps, money orders, scrip or traveler's checks. For purposes of this disclosure an ATM, an automated banking machine, or an automated transaction machine shall encompass any device which carries out transactions including transfers of value.

Many ATMs are configured to require consumers to enter a Personal Identification Number (PIN) with a keypad of the ATM prior to being granted permission to perform transaction functions with the ATM. The PIN is communicated to a host system by the ATM for purposes of authenticating the identity of the consumer. To prevent the PIN from being stolen by an unauthorized party, ATMs are operative to encrypt the PIN prior to sending the PIN to a host system. For many years Single-DES encryption has been used by ATMs to encrypt PINs using an 8 byte Communication (COM) secret key. Unfortunately, as the cost of computer processing power decreases over time, the risk of the encryption being cracked by unauthorized individuals or entities is increasing. Consequently, there exists a need for new and existing ATMs to include support for a more secure encryption protocol.

PIN information may be encrypted using a COM key known to both the ATM and the host system. The COM key may be securely sent to the ATM from the host system by encrypting the COM key with a terminal master key known to both the ATM and the host system. To maintain the secrecy of a terminal master key, when an ATM is being initially configured for operation, the initial terminal master key is often required to be manually installed by a two-person team at the ATM. Each person of the team has knowledge of only a portion of the information necessary to generate the initial terminal master key. To install the terminal master key successfully, each person must input into the ATM his or her known portion of the terminal master key. Once installed, the inputted portions undergo a mathematical procedure that results in a sixteen (16) character key unknown to either person.

In general, financial institutions or other entities which operate ATMs, are responsible for inserting a unique initial terminal master key in their ATMs. Such entities are also responsible for periodically updating the COM key used for PIN encryption. Although the use of two-person teams to install the initial terminal master key increases the security of the system, in general such a protocol increases the maintenance costs per ATM and is generally cumbersome to manage. As a result, existing keys on ATMs are often not updated on a regular basis, which increases their vulnerability to being cracked. Consequently, there exists a need for a new system and method of installing the initial terminal master key which is less costly and less cumbersome to perform. There is a further need for a new system and method of installing a terminal master key on an ATM which is equally or more secure than a two-person team system.

DISCLOSURE OF INVENTION

It is an object of an exemplary embodiment to provide an automated banking machine at which a user may conduct transactions.

It is a further object of an exemplary embodiment to provide an automated banking machine which is more secure.

It is a further object of an exemplary embodiment to provide an automated banking machine which supports more secure encryption protocols.

It is a further object of an exemplary embodiment to provide a system and method for securely installing a terminal master key on an automated banking machine.

It is a further object of an exemplary embodiment to provide a system and method for securely and remotely installing a terminal master key on an automated banking machine.

It is a further object of an exemplary embodiment to provide a system and method for securely and remotely installing a terminal master key on an automated banking machine with the use of only a single operator at the ATM.

Further objects of exemplary embodiments will be made apparent in the following Best Modes for Carrying Out Invention and the appended claims.

The foregoing objects are accomplished in an exemplary embodiment by an automated banking machine that includes output devices such as a display screen, and input devices such as a touch screen and/or a keyboard. The ATM further includes devices such as a cash dispenser mechanism for sheets of currency, a printer mechanism, a card reader/writer, a depository mechanism and other transaction function devices that are used by the machine in carrying out banking transactions. In the exemplary embodiment the ATM includes at least one computer.

The computer is in operative connection with the output devices and the input devices, as well as with the cash dispenser mechanism, card reader and other physical transaction function devices in the banking machine. The computer is further operative to communicate with a host system located remotely from the ATM.

In the exemplary embodiment, the computer includes software programs that are executable therein. The software programs of the ATM are operative to cause the computer to output user interface screens through a display device of the ATM. The user interface screens include consumer screens which provide a consumer with information for performing consumer operations such as banking functions with the ATM. The user interface screens further include service screens which provide a person servicing the ATM with information for performing service and maintenance operations with the ATM. In addition the ATM includes software programs operative in the computer for controlling and communicating with hardware devices of the ATM including the transaction function devices.

In an exemplary embodiment, the ATM includes encryption software and/or hardware which is operative to encrypt PIN information with DES keys securely received from the host system. In one exemplary embodiment, the ATM includes a keypad or encrypting pin pad (EPP) input device which is operative to encrypt a consumer entered PIN within a secure module directly at the keypad. The EPPs of exemplary embodiments are further operative to perform either Single-DES or Triple-DES encryption operations for message authentication, local PIN verification and key transport.

In the exemplary embodiment, the EPP and/or other hardware/software in the computer may be operative to establish a secure communication session between the ATM and a host system environment for transferring terminal master keys to the ATM from the host system. In the exemplary embodiment, individual authentication may be required from both the ATM and the host system to establish the secure communication session. Authentication may be achieved in one exemplary embodiment using digital certificates and digital signatures. Both the ATM and the host system each have individual certificates which may be exchanged between the ATM and host system in a point-to-point communication. The exchanged certificates enable the ATM and the host system to authenticate each other and establish a secure session through a Public Key Infrastructure (PKI). The secure session enables DES keys to be remotely installed and updated on an ATM by a host system. In the exemplary embodiment, the host system may be operative to coordinate the remote key management of DES keys for a plurality of ATMs connected to the host system.

To facilitate authentication and key management, both the ATM and host system may each include a pair of certificates. A first one of the certificates may be used for enciphering and deciphering information sent between the host system and the ATM. A second one of the certificates may be used for generating digital signatures and verifying digital signatures on information passed between the host system and ATM. In the exemplary embodiment, the ATM or a device of the ATM such as an encrypting keypad or encrypting pin pad (EPP) may be manufactured to include an initial set of the certificates which are issued by an initial certificate authority (CA). The exemplary ATM or a EPP device of the ATM may also be manufactured to include the public keys of the initial CA. In addition a host system connected to the ATM may include certificates issued by the initial CA and the public keys of the initial CA.

In the exemplary embodiment, an operator at the ATM may be enabled to cause the ATM to initiate the exchange of certificates between the ATM and the host system. To prevent a possible man-in-the-middle attack on the ATM and host, exemplary embodiments may include the ATM outputting through a display device of the ATM, a one-way hash of the public key of the host system found on each certificate of the host system. The operator may then independently verify that each displayed one-way hash corresponds to a hash of the expected public key found in an authentic certificate of the host system.

In an exemplary embodiment, a financial institution may be operative to replace the initial CA with a new CA and may be operative to remotely cause the ATM and the host system to receive new sets of certificates issued by the new CA.

BRIEF DESCRIPTION OF DRAWINGS

FIG. 7 schematically represents an exemplary embodiment of a format for an unsolicited status message.

FIG. 8 schematically represents an exemplary embodiment of a format for a write command message.

FIG. 9 schematically represents an exemplary embodiment of a format for a solicited status message.

FIG. 10 schematically represents an exemplary embodiment of a format for an operational command message.

BEST MODES FOR CARRYING OUT INVENTION

Figure 1:
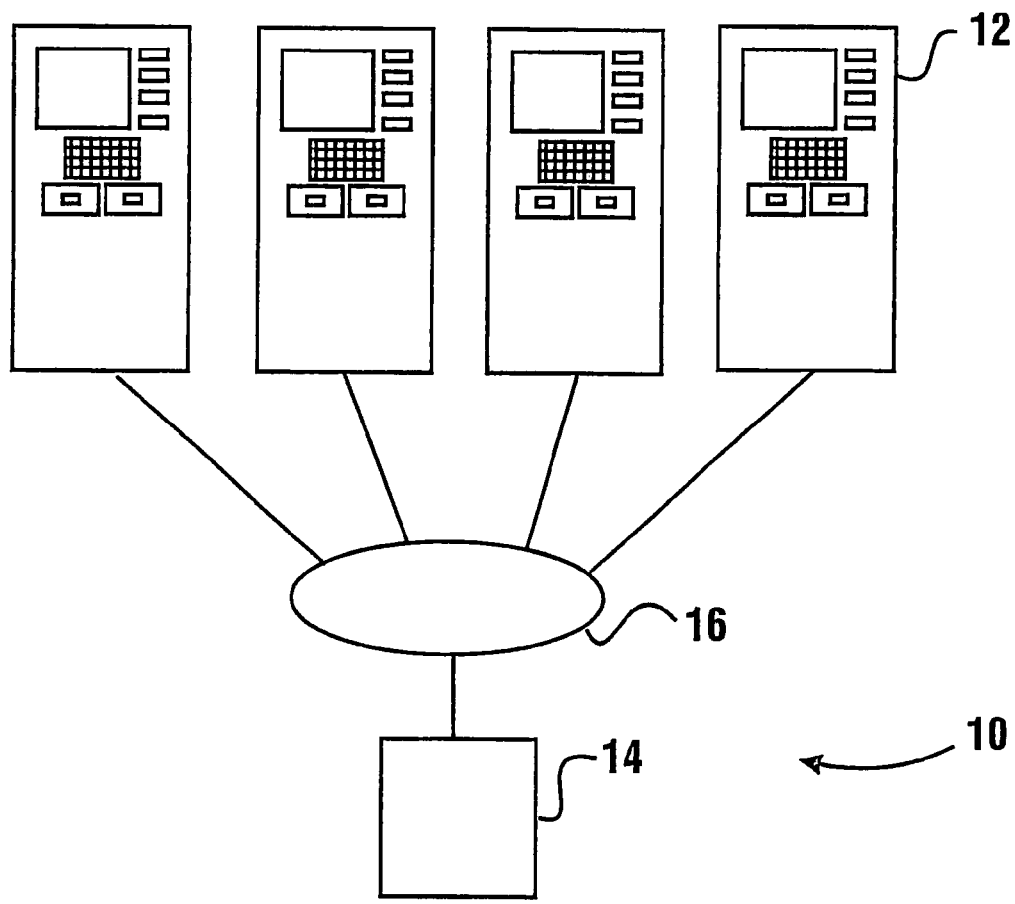
FIG. 1 is a schematic view of an exemplary embodiment of an ATM system.

Referring now to the drawings and particularly to FIG. 1, there is shown therein a network configuration schematically indicated 10, which includes the automated banking machine apparatus and system of an exemplary embodiment. Network 10 includes a plurality of automated banking machines 12 which in the exemplary embodiment are ATMs. ATMs 12 are connected to a computer system of a host system schematically indicated 14. Host system 14 includes a computer system that may be operated by the bank or other institution which has primary responsibility for the ATMs 12. Host banking system 14 may be connected to the ATMs 12 through a network 16. Network 16 may include a local or proprietary network or a public network such as the Internet which provides communication between the computer system 14 and the banking machines 12. In one exemplary embodiment the messages are transmitted through the network 16 in the Transmission Control Protocol/Internet Protocol ("TCP/IP") format. In addition, the messages sent through network 16 may be sent in an encrypted or unencrypted form depending on the nature of the system and the security needs of the home bank.

Figure 2:
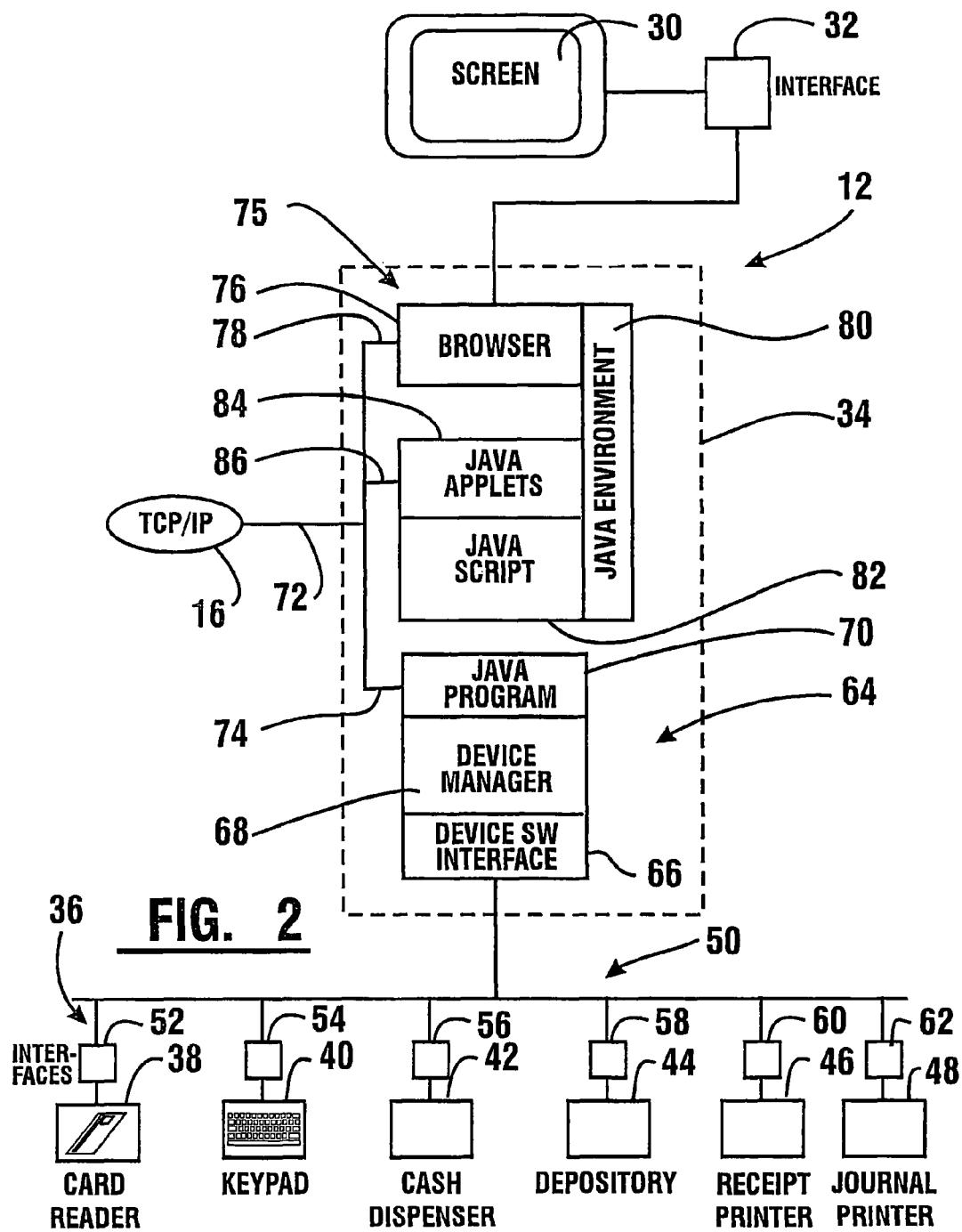
FIG. 2 is a schematic view of a further exemplary embodiment of an ATM system.

FIG. 2 shows a schematic view of the ATM 12 used in connection with an exemplary embodiment. ATM 12 may include a touch screen 30. Touch screen 30 includes a display screen which serves as an output device for communication with a user of the machine. Touch screen 30, because it is a touch screen, also serves as an input device for receiving input instructions from a user. Touch screen 30 may be connected through an interface 32 to a computer 34 which is preferably housed within the machine. Alternative exemplary embodiments may include other output devices such as audio speakers and/or other display screens which may or may not be integrated with input devices. Alternative exemplary embodiments may also include other input devices such as function keys and keyboards which may or may not be integrated with output devices.

Computer 34 may also be in connection with a plurality of transaction function devices 36 which are included in ATM 12. Devices 36 may include for example, a card reader/writer mechanism 38 and a keypad 40. Devices 36 may further include a cash dispenser mechanism 42 which is operative to dispense sheets, which in some embodiments are currency or bank notes. Exemplary devices 36 may also include a depository 44 for accepting deposits into a secure location in the machine. A receipt printer 46 for providing transaction receipts to customers may also be included among devices 36. A journal printer 48 may also be included among the devices for keeping a hard copy record of transaction information. In other exemplary embodiments other or additional transaction function devices which carry out other transaction functions may be used. Other exemplary embodiments may include fewer transaction function devices. It should be further understood that while the described exemplary embodiment is an automated banking machine, the principles of the embodiments described herein may be employed in many types of transaction machines that do not necessarily carry out banking transactions. Each of the devices may be operatively connected to an internal control bus 50 within the banking machine 12. The control bus 50 outputs the internal messages to the particular devices. Each device may have an appropriate hardware interface which enables the particular device to operate to carry out its respective function in response to the messages transmitted to it on control bus 50. Card reader/writer 38 may have a hardware interface schematically shown as 52. Hardware interfaces 54, 56, 58, 60 and 62 may be respectively operative to connect key pad 40, cash dispenser mechanism 42, depository mechanism 44, receipt printer mechanism 46 and journal printer mechanism 48 to the control bus 50.

Computer 34 may have several software programs that are executable therein. In an exemplary embodiment these software programs may include a device interfacing software portion generally indicated 64. Device interfacing software portion 64 may include a software device interface 66 that communicates electronic messages with the control bus 50. The device interface software portion 64 may also include a device manager 68. The device manager may be operative to manage the various devices 36 and to control their various states so as to be assured that they properly operate in sequence. In an exemplary embodiment, the device manager may also operative to coordinate device objects in the software so as to enable operation of the devices by at least one object-oriented program 70. The object oriented program portion 70, for example may include an application written in the JAVA® language by Sun Microsystems or an application designed to operator according to Microsoft's .Net platform. Program 70 may work in conjunction with the device manager to receive object-oriented JAVA® or .NET messages which cause the devices to operate, and to transmit device operation messages indicative of a manner in which devices are operating and/or are receiving input data.

The device interfacing software portion 64 in the described exemplary embodiment may operate on computer 34 and may communicate through a physical TCP/IP connection 72 with the network 16. The physical connection may be analog dial-up, serial port, DSL, ISDN connection or other suitable network connection. In the configuration of the system as shown, device interfacing software portion 64 may communicate at the IP address of computer 34 and at an IP port or socket indicated 74 that is different from the other software applications. In other embodiments, device interfacing software portion 64 may operate in a different computer than the other software applications.

In further exemplary embodiments, the device interfacing portion 64 may also be based on an open standard platform such WOSA/XFS (Windows Open Services Architecture/eXtensions for Financial Services) or J/XFS (Java/eXtensions for Financial Services). Such platforms include an open XFS manager which provides a uniform API for communication with the devices 36. When using an XFS manager, the device interfacing portion may communicate with the hardware interfaces 52, 54, 56, 58, 60 and 62 through software components such as service provider (SP) interfaces supplied by the vendors of the devices 36.

It should further be understood that although in this described exemplary embodiment the device interfacing portion 64 may be software, in other embodiments all or portions of the instruction steps executed by software portion 64 may be resident in firmware or in other program media in connection with one or more computers, which are operative to communicate with devices 36. All such forms of executable instructions shall be referred to herein as software.

Other software may also operate in computer 34. This software may include interface applications 75 which are operative to output interface screens through the output device 30 which provide information and instructions to consumers and/or operators for operating the ATM 12. In one exemplary embodiment the interface applications may include software for handling mark up language documents. In the exemplary embodiment the interface applications may include HyperText Markup Language (HTML) document processing software such as a browser, schematically indicated 76. In this described exemplary embodiment, the HTML document handling software includes a browser provided by Netscape®. However, in other embodiments other HTML document handling and communicating software and browser software, such as Internet Explorer™ from Microsoft, may be used. It should be understood that in some exemplary embodiments browsers which process markup language documents to provide visible and/or audible outputs as well as other outputs, as well as browsers which do not provide human perceivable outputs, may be used. Browser 76 may communicate in computer 34 at an IP port indicated by 78.

In an exemplary embodiment, the browser 76 may be in operative connection with JAVA® environment software 80 which enables computer 34 to run JAVA® language programs. However, other exemplary embodiments may use different types of software programs including Microsoft .NET applications and proprietary and platform specific terminal control software.

The JAVA® environment software 80 enables computer 34 to execute instructions in JAVA® script, schematically indicated 82. The instructions that are executed by the computer in JAVA® script may be embedded JAVA® script commands that are included in the HTML documents or other markup language documents which are received through the browser 76. The browser 76 in connection with the JAVA® environment software 80 which executes instructions in the embedded JAVA® script 82, serve as an HTML document handling software portion for transmitting and receiving HTML documents and TCP/IP messages through the IP port indicated by 78.

Computer 34 may also have executable software therein having a device application portion 84. The device application portion 84 may contain executable instructions related to operation of the devices 36. In one exemplary embodiment, the device application portion may include a plurality of JAVA® applets. In the described embodiment the applets include programs operable to control and keep track of the status of the devices with which they are associated. Certain applets may be operable to configure the browser to communicate messages. Certain applets may manage security and authenticate entities that use the ATM. It should be understood that this approach is exemplary and in other embodiments other approaches may be used. For example, other embodiments may use .Net components and objects rather than or in addition to JAVA® applets.

In the described embodiment, JAVA® applets may be associated with functions such as enabling the card reader mechanism, notifying the browser when a user's card data has been entered, operating the receipt printer mechanism, operating the journal printer mechanism, enabling the customer keyboard and receiving data input through the keyboard, operating the sheet dispenser mechanism, operating the depository, navigating to document addresses, timing device functions, verifying digital signatures, handling encryption of messages, controlling the mix of bills dispensed from multiple cash dispenser mechanisms, calculating foreign exchange, and ending a transaction and instructing the browser to return to communication with a server. Of course, in other embodiments, other applets or components may be used to control devices and use data to carry out various desired functions with the machine. The device application portion 84 may communicate in the computer 34 at an IP port indicated 86.

In the described embodiment, the device application portion 84 of the software may not communicate its messages directly to the device interfacing software portion 64. However, it should be understood that some embodiments may provide for the device application portion 84 to directly communicate device operation messages to the device program 70. This may be done either internally using TCP/IP, by delivery of messages in a conventional manner through a queue established in the operating system of the computer that is associated with the software that interfaces with the devices, or by direct call to this software.

Figure 3:
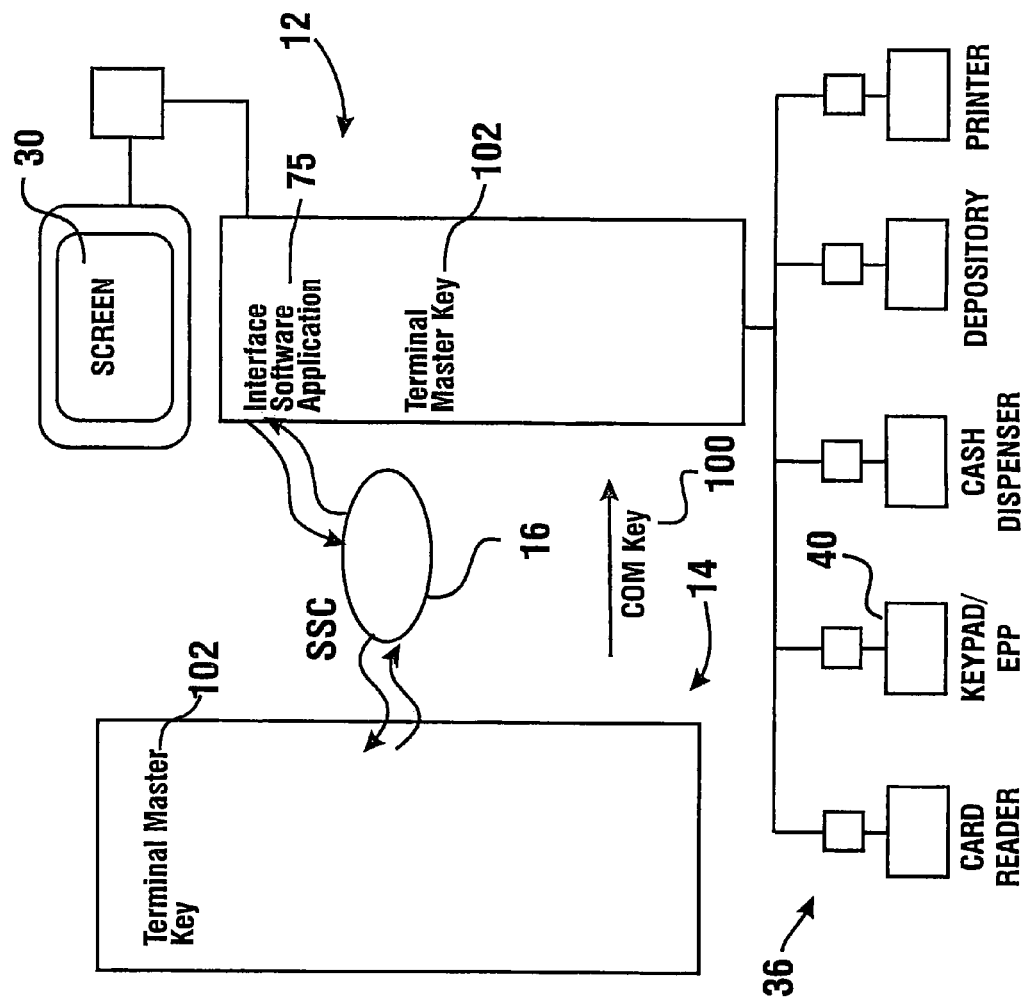
FIG. 3 is a schematic view of an exemplary embodiment of a system for remotely transferring terminal keys from a host system to an ATM.

FIG. 3 shows an exemplary embodiment of the ATM 12 in communication through the network 16 with a financial transaction processing system which in this example includes the host system 14. Host system 14 includes at least one server computer and may be operative to keep track of debiting or crediting customers' accounts when they conduct transactions at the automated banking machines. In addition host system 14 may be operative to track transactions for purposes of accomplishing settlements with other institutions who are participants in the system and whose customers conduct transactions at the ATMs 12. In an exemplary embodiment the host system 14 may be operative to communicate messages to the ATM 12 through network 16 using a secure socket connection ("SSC") so as to minimize the risk of interception of the messages. Of course other techniques, including encryption message techniques, may be used to minimize the risk of interception of the messages. It should be understood that the make of ATM 12 is exemplary and other types of ATMs may be used with exemplary embodiments.

In the exemplary embodiment messages sent to the ATM 12 may include the instructions and information for the ATM to verify that the messages it receives are genuine. This may include digital signatures which when transferred using public key or private key encryption techniques verify the messages as genuine. The machine checks to be sure the signature in the messages received from the host system or another system corresponds to the digital signature for that address stored in memory, and enables operation with the transaction devices, such as the cash dispenser 42, or the keypad 40 only when such correspondence is present. Of course various approaches to verifying and encrypting messages may be used in various embodiments. As used herein signatures or signed records encompass any indicia which is included in or is derivable from a record, such as a message or document which is indicative that it is authorized.

When performing transactions for a consumer, an exemplary embodiment of the interface application 75 may be operative to prompt a consumer to input his/her Personal Identification Number (PIN) using an input device such as keypad 40 of the ATM 12. The exemplary embodiment of the ATM 12 includes encryption software and/or hardware which is operative to encrypt PIN information with a Communication (COM) secret key and a corresponding encryption algorithm and protocol. Examples of encryption algorithms and protocols which an exemplary embodiment may use to encrypt PIN information include symmetric cryptography algorithms such as Single-DES encryption and double-length key Triple-DES encryption. In other alternative exemplary embodiments, other symmetric or asymmetric cryptography algorithms and protocols may be used.

When the exemplary embodiment of the ATM 12 is initially configured to perform transactions with the host system 14, a communication (COM) key 100 may be securely sent from the host system 14 to the ATM 12 through the network 16. To prevent the COM key 100 from being stolen by an unauthorized third party, the COM key may be encrypted with a terminal master key 102 known to both the host system and the ATM. In the exemplary embodiment the terminal master key 102 may be a DES secret key, however in alternative exemplary embodiments the terminal master key may correspond to the one or more encryption keys for use with other symmetric or asymmetric encryption algorithms and protocols.

As discussed previously, a current practice for installing the terminal master key on an ATM includes having a two-person team manually input two different key components which are used by the ATM to construct the terminal master key. The described exemplary embodiment may be operative to install the terminal master key on an ATM remotely from the host system without the use of a two-person team.

Figure 4:
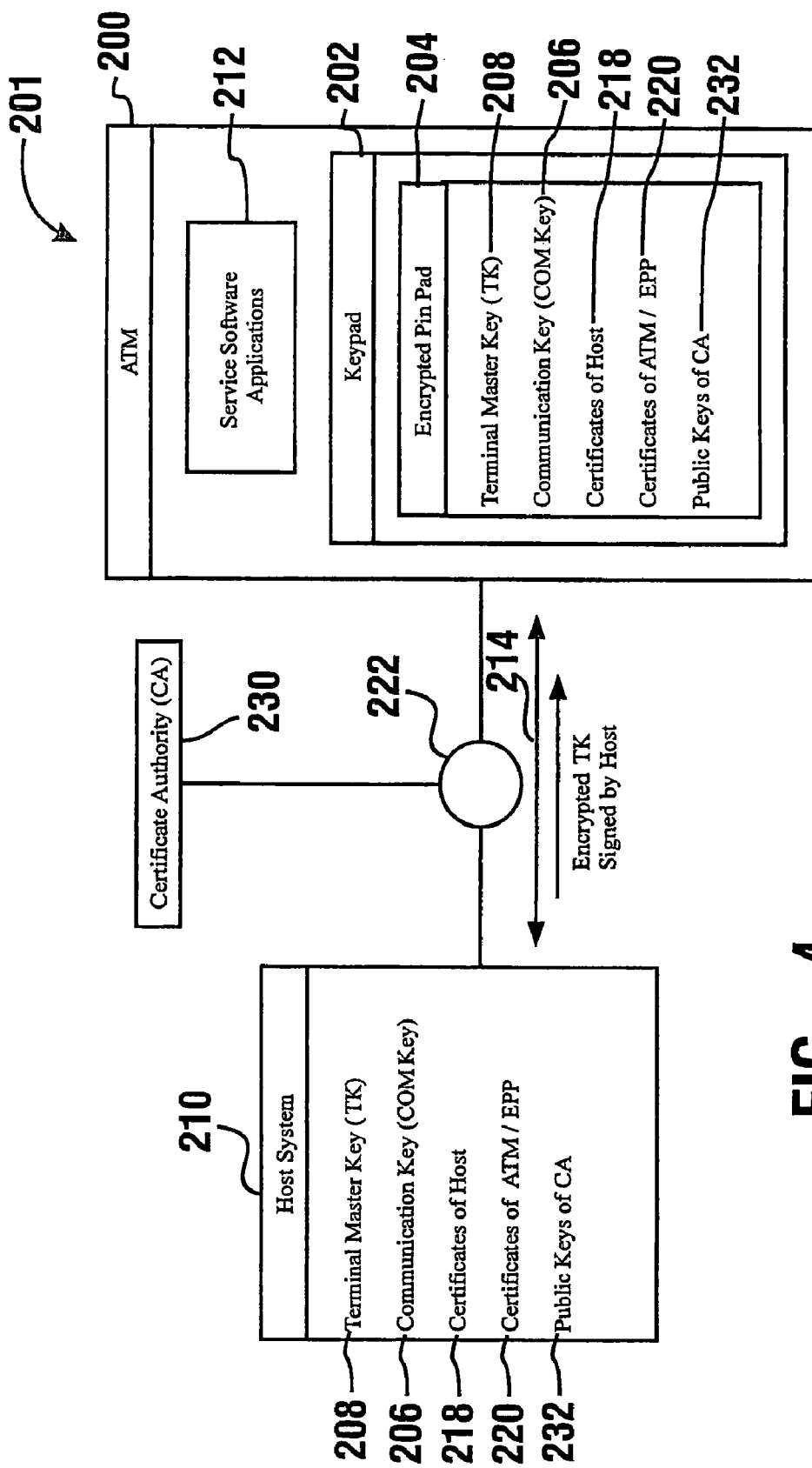
FIG. 4 is a further schematic view of an exemplary embodiment of a system for remotely transferring terminal keys from a host system to an ATM.

FIG. 4 shows a schematic view of an exemplary embodiment of an ATM 200. ATM 200 includes a keypad 202. The keypad 202 includes an EPP 204 which may be operative to perform the encryption of inputs through the keypad and the encryption/decryption of information being sent in messages between the ATM and a host system. For example in exemplary embodiments, the EPP may be operative to encrypt an input such as an inputted PIN using the COM key 206. The EPP 204 of the exemplary embodiment may further be operative to perform steps necessary to securely acquire the COM key 206 from the host system 210 using a terminal master key 208. In addition, the exemplary embodiment of the EPP 204 may be operative to perform steps necessary to securely acquire the terminal master key 208 from the host system 210.

To securely transfer the terminal master key 208 from the host system 210 to the ATM 200, the exemplary ATM 200 is operatively programmed to cause the EPP 204 to establish a secure communication session, socket, and/or channel 214 between the ATM 200 and the host system 210 that may be used to securely transfer the terminal master key 208 through a network 222. The exemplary ATM 200 may include a service software application 212. The service software application 212 may be operative responsive to commands inputted into the ATM 200 by a single operator to cause the ATM 200 to establish the secure communication session 214 for securely transferring the terminal master key 208 to the EPP 204.

In the exemplary embodiment, individual authentication may be required from both the ATM 200 and the host system 210. Authentication may be achieved in one exemplary embodiment using certificates and a Public Key Infrastructure generally indicated 201. In this described exemplary embodiment, both the ATM 200 and the host system 210 each are associated with their own digital certificates 218, 220. The secure communication session 214 may be initiated by exchanging the certificates 218 of the host and the certificates of the ATM 220 between the ATM 200 and the host system 210. In one exemplary embodiment, the certificates 218, 220 may be authenticated by both the ATM 200 and the host system 210 using a public key 232 of a trusted certificate authority (CA) 230.

Once the certificates 218, 220 have been exchanged and authenticated, the exemplary embodiment of the ATM and host system may pass encrypted and digitally signed information between them. Such information for example may include signed messages, encrypted secret keys, updated CA public keys, and updated certificates. As shown in FIG. 4 the exemplary ATM 200 and host system 210 may be further operative to use the exemplary PKI system 201 to securely transfer the terminal master key 208 to the ATM 200. This may be achieved in one exemplary embodiment by having the host system 210 encrypt the terminal master key 208 using a public key associated with at least one certificate 220 of the ATM. The host system 210 may then send a digitally signed message to the ATM 200 which includes the encrypted terminal master key 216. In the exemplary embodiment, the ATM 200 may be operative to decrypt the encrypted terminal master key 216 using a corresponding private key of the ATM 200. In addition the ATM 200 may be operative to authenticate the digital signature of the host system using a public key from one the certificates 218 of the host system. Using this described exemplary process, an exemplary host system may be operative in accordance with its programming to coordinate the remote key management of terminal master keys for a plurality of ATMs 200 connected to the host system.

When certificates are initially exchanged between the ATM 200 and the host system 210, there exists a possibility that an unauthorized entity may perform a man-in-the-middle hacking attack to uncover information being passed between the ATM and host system. During such an attack the unauthorized entity may simultaneously impersonate both the ATM and the host system by exchanging imposter messages for the original messages being transferred between the ATM and host system. To reduce the risk of this type of attack, the service software application 212 may be operatively programmed to cause the ATM 200 to display through a display device, a one-way hash or digest of the public key of the host system found on the certificate 218 of the host system. The exemplary one-way hash of the public key of the host system may be calculated by the exemplary ATM 200 using a one-way hash function such as RD5 or SHA-1. The operator may then independently verify that the displayed one-way hash is identical to a one-way hash of the public key of the host system known by the operator to correspond to an authentic certificate of the host system.

In the exemplary embodiment, to facilitate both authentication and key management, the host system 210 may include two certificates 218 and the ATM 200 may include two certificates 220. A first one of the certificates may be associated with a first set of private/public key pairs which are used for encrypting and deciphering the terminal master key and other information sent between the host system and the ATM. A second one of the certificates may be associated with a second set of private/public key pairs used for signing and verifying digital signatures on information passed between the host system and the ATM. In the exemplary embodiment, the EPP 204 of the ATM 200 may be manufactured to include the initial set of certificates 220 of the ATM stored therein. Such certificates 220 of the ATM which may be stored in a memory of the EPP 204 are issued by the CA 230. The certificates 218 of the host system may also be issued by the CA 230. However, it is to be understood that in alternative exemplary embodiments the certificates 218, 220 may be issued by different certificate authorities.

In the exemplary embodiment, the EPP 204 may include the necessary processing capabilities and programming to validate/authenticate the certificates 218 received from the host system 210 by validating/authenticating the digital signature of the CA 230 found on the certificates 218 of host system 210. In the exemplary embodiment, the EPP 204 may be manufactured to include the public keys 232 of the CA 230. The public keys 232 of the CA may be used by the EPP 204 to validate/authenticate the digital signatures of the CA found on the certificates of the host 218. Likewise, the host system 210 may be operative to validate/authenticate the certificates 220 of the ATM using the public keys 232 of the CA.

In exemplary embodiments, the terminal master key may be transferred between the host and an ATM using a remote key transport process based on protocols such as the key transport mechanism 5 of ISO/IEC 11770-3 and the three-pass authentication mechanism of ISO/IEC 9798-3. These protocols may be used to transfer two shared secret keys in three passes and provide mutual entity authentication and key confirmation.

In exemplary embodiments, the EPP may be constructed so as prevent the secret encryption keys stored therein from being retrieved from the EPP by an unauthorized user, entity, software program, hardware device, or other probing or sniffing device. Exemplary embodiments of the EPP may further be operative to destroy and/or delete the secret keys from the memory of the EPP in response to the EPP being tampered with. For example, an exemplary embodiment of the EPP may destroy all or portions of the EPP memory in response to the packaging or outer enclosure of the EPP being opened or altered.

Figure 5:
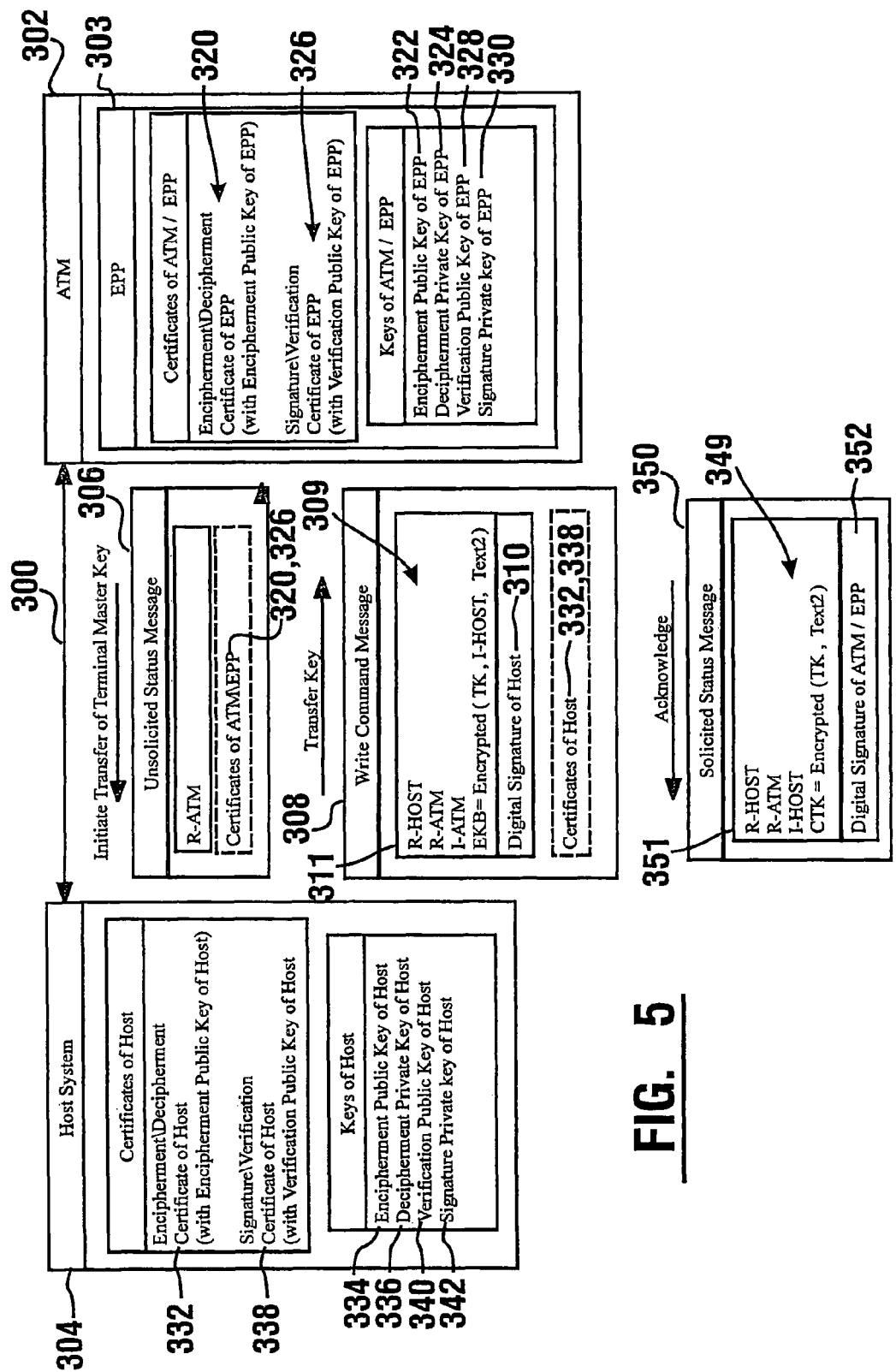
FIG. 5 schematically represents an exemplary embodiment of a system and method for transferring a terminal master key from a host system to an ATM.

FIG. 5 shows a schematic view of system and method by which a single operator at an ATM 302 may initiate the process of transferring a terminal master key to the ATM 302 from the host system 304. This method comprises a plurality of messages 306, 308, 350 being sent between the ATM and the host system which establish a secure communication session, socket, and/or channel 300 between the host system 304 and the ATM 302 which is used to transfer the terminal master key across a network. In this exemplary embodiment, a modified key transport mechanism may be employed which is based on the ISO/IEC 11770-3 and ISO/IEC 9798-3 protocols and which provides unilateral key transport from the host system to the ATM. In this described exemplary embodiment, ATM 302 may enable a single operator to input a command through an input device of the ATM which causes the ATM to initiate the remote transfer of a terminal master key to the ATM. In exemplary embodiments the key transfer may also be initiated by the host system.

In the exemplary embodiment, the ATM 302 and/or an EPP 303 of the ATM may generate a random number (R-ATM) in response to receiving the input from the operator. The random number (R-ATM) may be sent by the ATM 302 to the host system 304 as part of at least one message 306 which may include for example an unsolicited status message or other types of messages capable of being sent by an ATM to a host system. In this described exemplary embodiment, certificates of the ATM and the host system may have been previously exchanged with each other as will be discussed below. However, in an alternative exemplary embodiment, if certificates of the ATM have not yet been exchanged with the host system, the exemplary ATM 302 may be operative to include a certificate 320 associated with encipherment/decipherment of the ATM/EPP and a certificate 326 associated with signature/verification 326 of the ATM/EPP with the message 306 at this time.

FIG. 7 shows an example format for the unsolicited status message in a Diebold 91X ATM message protocol environment that may be used for message 306. Here the random number (R-ATM) may be stored in the buffer data field 307 of the unsolicited status message. The status field 305 may include data which indicates that the unsolicited status message corresponds to a request to initiate the process of transferring the terminal master key.

In response to receiving the message 306 from the ATM, the exemplary host system may be operative to generate and return to the ATM at least one message 308 including for example a write command message or other types of message that an ATM is capable of receiving from a host system. The message 308 from the host system includes a terminal master key (TK) encrypted within an Encipherment Key Block (EKB). In the exemplary embodiment, the host system may generate the Encipherment Key Block (EKB) by encrypting the terminal master key (TK) and identifying data associated with the host system such as a host distinguishing identifier (I-Host) using a public encipherment transformation associated with the ATM and/or EPP of the ATM. The host distinguishing identifier (I-Host) may correspond to a unique number, name or other indicia which is associated with the host 304. In the exemplary embodiment the public encipherment transformation associated with the ATM/EPP may include encrypting the information (TK and I-Host) using an encipherment public key 322 associated with the encryption/decryption certificate 320 of the ATM/EPP In addition to sending the encrypted terminal master key (TK) and host distinguishing identifier (I-Host), the host system may be operative to send as part of the message 308 a random number generated by the host (R-Host), the random number received from the ATM (R-ATM), and identifying data associated with the ATM such as an ATM distinguishing identifier (I-ATM). The ATM distinguishing identifier corresponds to a unique number, name or other indicia associated with the ATM 302 or the EPP 303 of the ATM.

In the exemplary embodiment, the message data 309 corresponding to the random number generated by the host system (R-Host), the random number received from the ATM (R-ATM), the ATM distinguishing identifier (I-ATM), and the Encipherment Key Block (EKB) may be digitally signed by the host system 304 to form a digital signature 310 using a private signature transformation associated with the host system. In the exemplary embodiment the private signature transformation associated with the host system may include signing the message using a signature private key 342 of the host system.

The resulting signed message 311 may use the PKCS #7: Cryptographic Message Syntax Standard format. The message syntax may use Abstract Syntax Notation One (ASN.1) with Basic Encoding Rules (BER) and Distinguished Encoding Rules (DER). In exemplary embodiments where the message of the host system is being transmitted over a 7-bit ASCII network such in a Diebold 91X ATM message protocol environment, the binary output of the Abstract Syntax Notation One (ASN.1) may be converted to 7-bit ASCII for transmission within the write command message. In an exemplary embodiment an encoding algorithm such as Base64 encoding may be used by the host system which is operative to convert octets (bytes) into printable ASCII characters. In other exemplary embodiments other encoding algorithms may be used which are operative to produce 7-bit ASCII from binary.

FIG. 8 shows an exemplary format for a write command message in a Diebold 91X ATM message protocol environment that may be used to transfer the information described as being included in the message 308 being sent to the ATM. Here the write command message 308 corresponds to a 91X Write Command VII message. The key change field 370 of the Write Command VII message may include data which indicates that the write command message corresponds to the remote transfer of a terminal master key. The encrypted and signed message data 311 which includes the terminal master key may be included in the new key data field 372 of the Write Command VII message. Referring back to FIG. 5, in an alternative exemplary embodiment, if certificates of the host system have not yet been exchanged with the ATM, the exemplary host system 304 may be operative to attach certificates 332, 338 of the host system to the message 308.

Once the message 308 is received by the ATM, the ATM and/or the EPP of the ATM may be operative to validate the digital signature 310 of the host system using the public verification transformation associated with the host system. In the exemplary embodiment the public verification transformation associated with the host may include validating the digital signature using a verification public key 340 associated with the signature/verification certificate 338 of the host. A positive validation of the digital signature may indicate that the message 308 from the ATM has not been tampered with prior to being received by the ATM 302. Also a positive validation of the digital signature may indicate that the information in the message 308 originates from the host system and not a third party hacker.

After validating the digital signature 310, the ATM and/or the EPP of the ATM may be operative to verify that the ATM distinguishing identifier data (I-ATM) in the message 308 corresponds to the identity of the ATM 302 and that the random number (R-ATM) in the message 308 corresponds to the original random number (R-ATM) sent to the host system in the message 306. In addition to these validations, the exemplary ATM 302 and/or an EPP 303 of the ATM may be operative to decrypt the Enciphered Key Block (EKB) using the private decipherment transformation associated with the ATM/EPP. In the exemplary embodiment the private decipherment transformation associated with the ATM/EPP includes decrypting the information (TK and I-Host) using a decipherment private key 324 stored in the memory of the EPP.

Decrypting the Enciphered Key Block (EKB) produces the terminal master key (TK) and the host distinguishing identifier (I-Host). If the decrypted host distinguishing identifier (I-Host) corresponds to the correct host system, the ATM 302 and/or the EPP of the ATM may be operative to accept the terminal master key (TK). In the exemplary embodiment, if the ATM and/or EPP of the ATM has been previously set to use a single-length key such as Single-DES encryption and the new terminal master key (TK) correspond to a double length key, the ATM and/or the EPP of the ATM may be operative to automatically switch to an algorithm which use double-length keys such as double-length key Triple-DES encryption. In addition if the ATM and/or EPP of the ATM has been previously set to use double-length keys and the new terminal master key (TK) correspond to a single length key, the ATM and/or EPP of the ATM may be operative to automatically switch to an algorithm which use single length keys such as Single-DES encryption.

As shown in FIG. 5, the exemplary embodiment of the ATM 302 may be operative to confirm the acceptance of the terminal master key (TK) by sending to the host system 304 at least one message 350 including for example a solicited status message or other types of messages capable of being sent by an ATM to a host system. In this described exemplary embodiment, the message data 349 transferred within the message 350 may include the random numbers (R-ATM, R-Host) and the host distinguishing identifier (I-Host). The message data 349 may be further signed by the ATM and/or the EPP of the ATM using a private signature transformation associated with the ATM/EPP. In the exemplary embodiment the private signature transformation associated with the ATM/EPP may include signing the message using a signature private key 330 stored in the memory of the EPP.

The resulting signed message data 351 may use the PKCS #7: Cryptographic Message Syntax Standard format. As discussed previously, this message syntax may use the Abstract Syntax Notation One (ASN.1) with Basic Encoding Rules (BER) and Distinguished Encoding Rules (DER) which is converted from octet (byte) strings to 7-bit ASCII using Base64 encoding. FIG. 9 shows an exemplary format for a solicited status message in a Diebold 91X ATM message protocol environment which may be used to transfer information corresponding to the described message 350. Here the solicited status message may include the signed message data 351 within a buffer data field 382.

In alternative exemplary embodiments, the message 350 may further include a cryptographic check value (CTK) for the terminal master key (TK). The cryptographic check value (CTK) may be generated with the ATM and/or the EPP of the ATM by encrypting the received Terminal Master Key (TK) with a verification number or a random number (text2) using a public encipherment transformation associated with the host system. In the exemplary embodiment the public encipherment transformation includes encrypting the information (TK, text2) using an encipherment public key 334 associated with the encryption/decryption certificate 332 of the host system. In this described alternative embodiment, the random number (text2) may originally have been generated by the host system 304 and sent to the ATM 302 in the Enciphered Key Block (EKB) of the message 308 from the host system.

After receiving the message 350 from the ATM, the host system 304 may be operative to verify the digital signature 352 using the public verification transformation associated with the ATM/EPP. In the exemplary embodiment the public verification transformation associated with the ATM/EPP may include verifying the digital signature 352 using a verification public key 328 associated with the signature/verification certificate 326 of the ATM/EPP. Once the digital signature 352 is verified, the host system 304 may be operative to verify that the distinguishing identifier (I-Host) and the random numbers (R-ATM and R-Host) agree with the corresponding values sent by the host system in the message 308. In the event that any one of the verifications performed by the ATM/EPP and host system fail, the exemplary ATM/EPP and host system may be operative to destroy the terminal master key (TK). Also in the exemplary embodiment, each time this exemplary protocol is executed, a new terminal master key (TK) may be generated.

In alternative embodiments, where the message 350 from the ATM includes a cryptographic check valve (CTK), the exemplary embodiment of the host system 304 may be operative to decrypt the cryptographic check value (CTK) using a private decipherment transformation associated with the host system. In the exemplary embodiment the private decipherment transformation may include decrypting the cryptographic check value (CTK) using the decipherment private key 336 of the host system. The resulting decrypted terminal master key (TK) and verification number (text2) may then be verified with the original values sent in the message 308 to further verify the integrity of the secure session 300.

Figure 6:
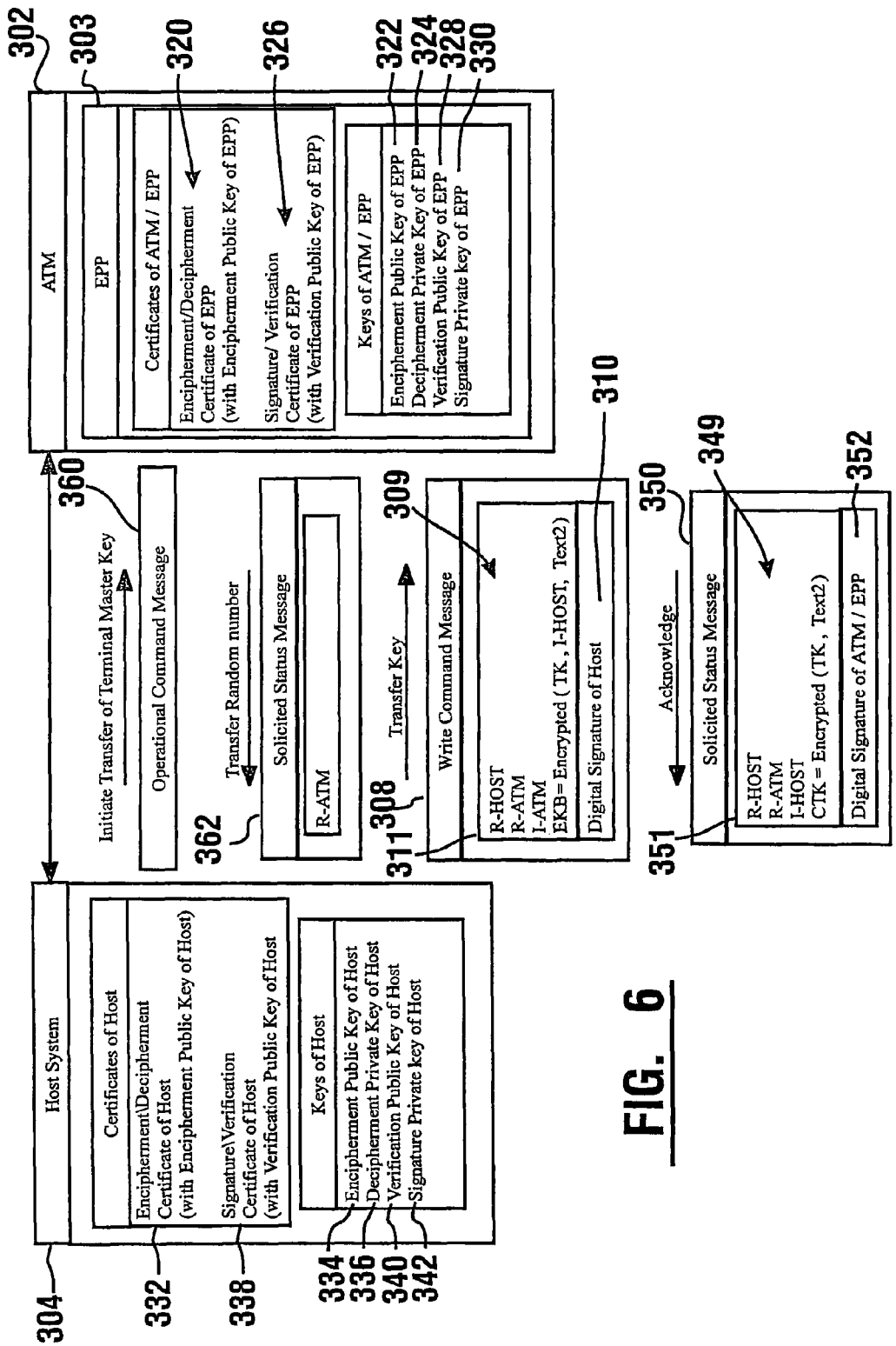
FIG. 6 schematically represents an exemplary embodiment of a system and method for transferring a terminal master key from a host system to an ATM.

In addition to enabling a single operator at an ATM to initiate the remote transfer of a terminal master key to an ATM, an exemplary embodiment of the present system may further include a transfer of the terminal master key which is initiated by the host system. FIG. 6 shows a schematic view of an exemplary embodiment where the host system 304 may be operative to initiate the transfer of the terminal master key by sending to the ATM 302 at least one message 360 including for example an operational command message or other types of messages an ATM is capable of receiving from a host system. FIG. 10 shows an example of the operational command message for a Diebold 91X ATM message protocol environment that may be used to transfer information corresponding to the described message 360. Here, the operational command message may include a command code field 363 which includes data representative of a command to initiate the remote transfer of terminal key. Referring back to FIG. 6, the ATM 632 may respond to receiving the message 360, by sending to the host system one or messages 362 including for example a solicited status message or other messages which an ATM is capable of sending to a host system. The messages 362 may contain the previously described random number (R-ATM). In a Diebold 91X ATM message protocol environment, for example, the data corresponding to the random number (R-ATM) may be included in a buffer data field of the solicited status message. After the host system 304 has received the message 362 with the random number (R-ATM), the messages 308, 350 may be transferred between the host system and ATM as previously described.

In this described exemplary embodiment the encipherment and decipherment transformations may be performed using public and private key pair sets and an asymmetric cryptography algorithm such as the RSA cryptography algorithm. In addition, the signature and verification transformations may be performed using a second set of public and private key pair sets and the RSA cryptography algorithm and a one-way hash function such as MD5 or SHA-1. The RSA modulus for this exemplary embodiment may be 2048 bits. In alternative exemplary embodiments, other encryption and signature protocols and algorithms may be used including DSA, and AES (Rijndael). Also in this described exemplary embodiment, cryptographic calculations of the ATM may be performed by a processor in the EPP 303 of the ATM 302. However, in other exemplary embodiments of the ATM, all or portions of the cryptographic calculations may be performed by other hardware devices, and computer processors of the ATM.

As discussed previously, many ATMs require a two-person team to install a terminal master key. The exemplary embodiment includes upgrading such ATMs to support receiving a terminal master key from a host system. In one exemplary embodiment, this upgrade may be performed by accessing the interior portion of an ATM and removing an existing EPP or other device designed to receive and/or hold a terminal master key constructed from two values manually inputted into the ATM by a two-person team. Once the existing EPP has been removed, an alternate EPP may be installed in its place. The alternate EPP may be operative to receive the terminal master key from the host system according to the previously described protocols. In this described embodiment the alternate EPP is operative to perform encryption, decryption, signature, and verification functions with the public and private keys of the EPP and the public keys associated with the host system and certificate authority stored in the EPP. In one exemplary embodiment, the alternate EPP may further be operative to encrypt inputted PIN values using either single-DES or triple-DES algorithms and protocols.

In an exemplary embodiment, the EPP may be manufactured to include the certificate associated with encipherment/decipherment 320 and the certificate associated with signature/verification 326 stored therein. In this described exemplary embodiment these certificates may be issued by an initial CA and are digitally signed using a primary private key of the initial CA. The certificates 332, 338 of the host system are likewise issued and signed by the initial CA.

In a further exemplary embodiment, the EPP may be manufactured to include a secondary set of the certificates 320 and 326 signed with a secondary private key of the initial CA. The secondary set of certificates is intended to be used as a backup, in the event that the secrecy of the primary private key of the initial CA is compromised. In such cases, the primary set of certificates may be revoked and the secondary set of certificates may be used in their place to sign/verify messages and encipher/decipher messages at the EPP and host system.

The revocation of the primary certificates may be initiated by the host system. The host system may send to the ATMs a secondary set of certificates of the host system signed with the secondary private key of the initial CA. When the exemplary EPP receives a secondary set of certificates from the host system, the EPP may be operative to return its secondary certificates to the host system. In alternative exemplary embodiments, the EPP and host system may initially exchange both primary and secondary sets of certificates. When it is necessary to revoke the primary set of certificates issued by the initial CA, the host system may send a message to each ATM which is representative of a command to stop using the primary certificates and to begin using the secondary certificates.

In addition to storing its own primary and secondary sets of certificates, the exemplary EPP may further be operative to store the primary and secondary public keys of the initial CA. These primary and secondary public keys of the initial CA may be included on respective primary and secondary certificates of the initial CA. The primary and secondary certificates of the CA may be self signed.

Figure 11:
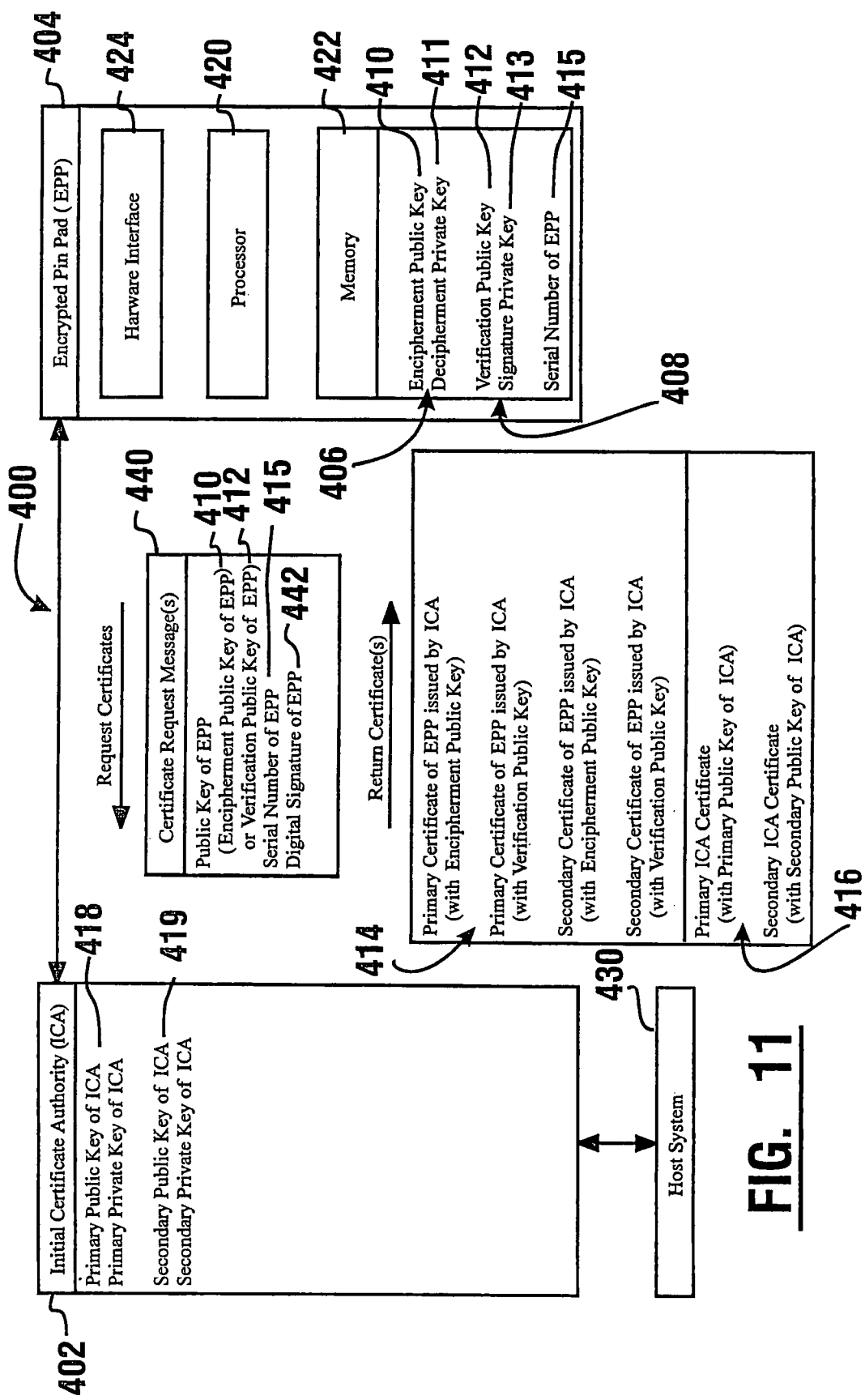
FIG. 11 schematically represents an exemplary embodiment of a system and method for installing certificates in an exemplary embodiment of an EPP.

FIG. 11 shows a schematic view of an exemplary process 400 that may be used in one exemplary embodiment to configure an EPP 404 with certificates generated by the initial CA 402. Here, the exemplary EPP 404 includes a processor 420, a memory 422 in operative connection with the processor, and a hardware interface 424 in operative connection with the processor. The exemplary processor 420 of the EPP 404 may be operative to communicate with external devices and servers such as a host system, a processor of an ATM, or the initial CA through the hardware interface 424. When the EPP is initially manufactured and/or is re-commissioned, the hardware interface 424 may be connected to a system that is capable of sending messages between the EPP and the initial CA 402. The system for initializing the EPP may include communication hardware, software and a network connection that is in communication with the initial CA and is operative to transfer messages between the EPP and the initial CA. In alternative exemplary embodiments, a system for initializing the EPP may include an ATM and host system that is in operative communication with the initial CA. The hardware interface of the EPP may be operative to communicate with the initial CA through the network interface of the ATM after being installed in the ATM.

When the exemplary EPP 404 is initially powered up, the processor 420 may be operatively programmed to generate a set of encipherment/decipherment public/private key pairs 406 and a set of signature/verification public/private key pairs 408. These keys 406, 408 may be stored by the processor in the memory 422. In the exemplary embodiment these keys 406, 408 may be RSA keys. However, it is to be understood that in alternative exemplary embodiments, keys for other encryption and digital signature algorithms and protocols may be generated.

After the sets of keys 406, 408 have been generated, the processor 420 may be operative to generate two certificate request messages 440 each containing one of the two generated public keys 410, 412 from the generated sets of keys 406, 408. These certificate request messages 440 may be signed using the respective private keys 411, 413 which correspond to the public keys 410, 412 in each certificate request message 440. Also, these messages may include a serial number or other unique identifier of the EPP. In an exemplary embodiment, the certificate request messages may be constructed according to the PKCS #10 Certification Request Syntax Standard format. The exemplary embodiment of the EPP may be operative to output the certificate request messages through its hardware interface 424 for purposes of communicating the certificate request messages to the initial CA.

In response to receiving the certificate request messages 440 the initial CA 402 may be operative to verify that the EPP has possession of the private keys 411 413 by verifying the digital signatures 442 of the messages 440 using the corresponding public key 410, 412 received in the messages 440. After verifying the digital signatures of the messages 440, the initial CA may generate and sign corresponding primary and secondary certificates 114 for each of the two public keys 410, 412 of the EPP. In addition, each of the certificates may include the serial number 415 of the EPP.

The EPP 404 may be operative to receive the newly generated primary and secondary certificates 114 through the hardware interface 424. The EPP may also be operative to receive the primary and secondary certificates 416 of the initial CA through the hardware interface. These certificates 416 of the initial CA may include the primary and secondary public keys 418, 419 of the initial CA and may be self-signed with the private keys corresponding to the public keys 418, 419 of the initial CA.

The EPP is operative to use the public keys 418 and 419 from the certificates 416 of the initial CA to validate the certificates 414 of the EPP. Further, the EPP may verify that the public keys in the certificates 414 of the EPP match the original public keys 410, 412 generated by the EPP. Also, the EPP may verify that the serial number in the certificates matches the original serial number 415 of the EPP.

The EPP 404 may store the received certificates 414 of the EPP in the memory 422. Also, the EPP 404 may store the public keys 418, 419 and/or the certificates 416 of the initial CA 402 in the memory 422. The memory 422 may be comprised of a nonvolatile memory that is operative to preserve the keys 406, 408 and certificates 414, 416 in the memory 422, during periods when the power has been removed from the EPP 404. In the described exemplary embodiment, the public keys 410, 412 of the EPP may each be sent to the initial CA 402 in their own respective certificate request messages 440. However, in alternative exemplary embodiments, both public keys 410, 412 of the EPP may be include in a single certificate request message.

In the exemplary embodiment, the host system 430 may also be operative to communicate with the initial CA 402 using the process previously described with respect to the EPP. The host system may generate its own sets of encipherment/decipherment public/private key pairs and signature/verification public/private key pairs. The host system may then enable one or more certificate request messages to be sent to an initial CA which includes the generated public keys of the host. The initial CA may issue corresponding encipherment/decipherment and signature/verification certificates for the host system. These certificates for the host system may be received by the host system along with the certificates of the initial CA for storage at the host system. In addition the initial CA may further issue both primary and secondary sets of the host certificates, where the first set is signed by the primary private key of the initial CA and the second set is signed by the secondary private key of the initial CA.

In the exemplary embodiment, the primary and secondary sets of certificates for the EPP include the same set of public keys of the EPP. However, in alternative exemplary embodiments, the EPP may generate both a primary set and a secondary set of encipherment/decipherment public/private key pairs and signature/verification public/private key pairs. The corresponding public keys from the primary set of keys may be forwarded to the initial CA to be integrated into the primary set of certificates of the EPP issued by the CA. The corresponding public keys from the secondary set of keys may be forwarded to the initial CA to be integrated into the secondary set of certificates of the EPP issued by the CA. In additional the exemplary primary and secondary host certificates may likewise be associated with separate sets of primary and secondary sets of encipherment/decipherment public/private key pairs and signature/verification public/private key pairs.

As discussed previously the certificates issued by the initial CA are exchanged between the host system 430 and the EPP 404. The public keys 418, 419 of the initial CA may be used by the host system 430 and the EPP 404 to authenticate the exchanged certificates of the EPP and host system. The exemplary embodiment may use a large key size for the keys 418, 419 of the initial CA so as to make the forging of the certificates much more difficult. However to further increase security, the exemplary EPP and/or the host system may be operative to limit the number of initial certificate exchanges in order to prevent possible future exchanges using forged certificates. In addition, in the exemplary embodiment, initial certificate exchanges may be locked out once a remote terminal master key transfer has been completed. However, prior to the terminal master key transport, multiple certificate exchanges may be permitted between the host and the ATM for testing purposes.

Figure 12:
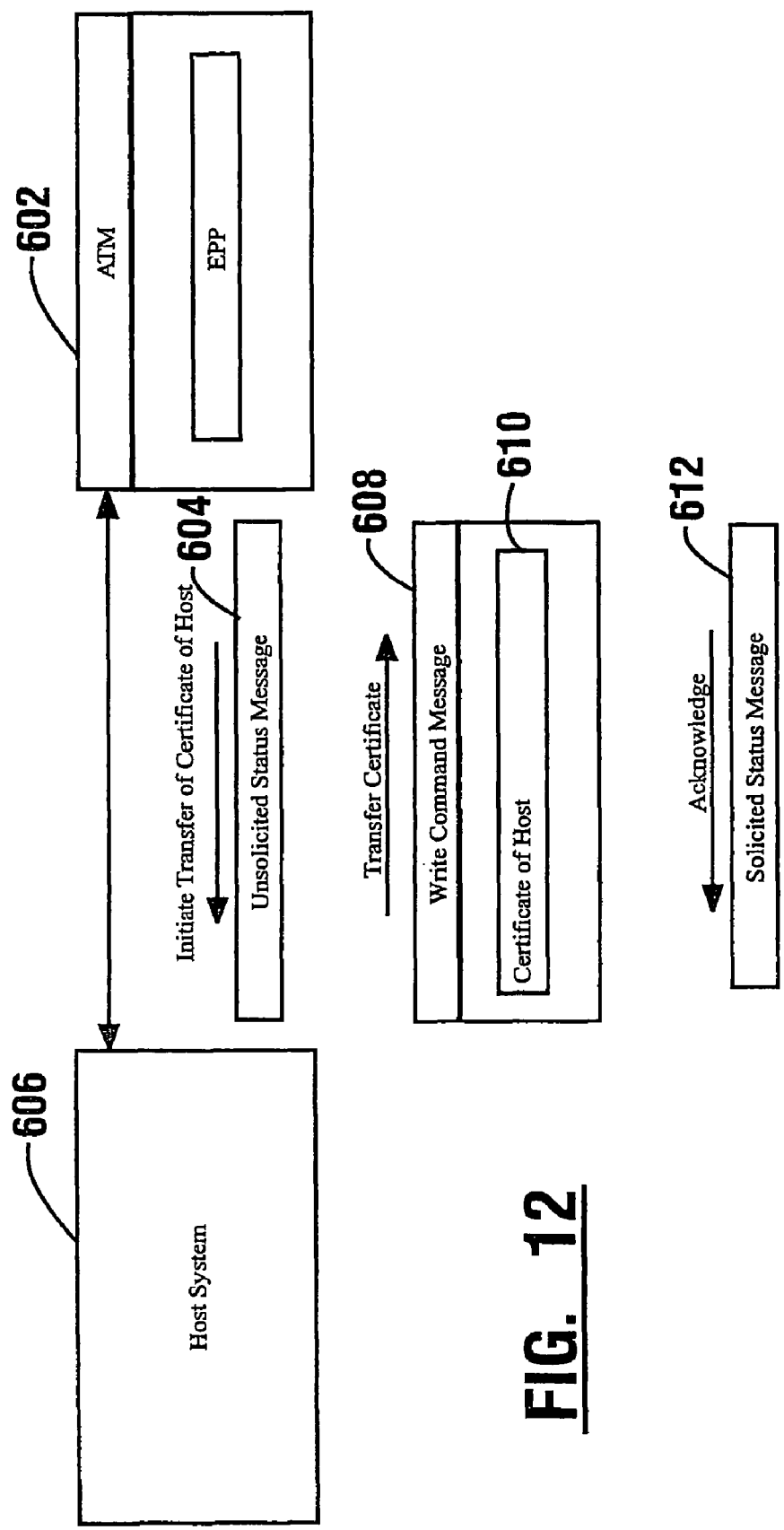
FIG. 12 schematically represents an exemplary embodiment of a system for transferring certificates of a host system to an EPP.

In the exemplary embodiment, the initial certificate exchange between the host system and EPP may be initiated by an operator inputting commands into the ATM, which causes the ATM to communicate with a host system and begin the certificate exchange. FIG. 12 schematically shows the certificate exchange process between an ATM 602 and a host system 606 that is initiated by an operator. Here exemplary embodiments of the ATM 602 may generate and send to the host system 606 at least one message 604 in response to receiving a command from an operator to initiate the certificate exchange. In the exemplary embodiment, the message 604 may include for example an unsolicited status message or other types of messages which an ATM is capable of sending to a host system. In a Diebold 91X ATM message protocol environment, for example, the unsolicited status message may include data in a status field which corresponds to "new network certificate required", The unsolicited status message may also include data in a device ID field which corresponds to the EPP.

In response to receiving the message 604, the host system may return to the ATM, a certificate containing the public key of the host system. In exemplary embodiments the host system may also be capable of initiating the sending of the certificate of the host to the ATM without first receiving a message 604 from the ATM.

As shown in FIG. 12, the host certificate 610 may be included in at least one message 608 being sent to the ATM. Such a message 608 may include for example a write command message or other types of messages which an ATM is capable of receiving from a host system. In a Diebold 91X ATM message protocol environment, for example, the write command message may correspond to a Write Command VII message with data in a key change field that includes the certificate 610 of the host system 606. Such data for the certificate may use the PKCS #7: Cryptographic Message Syntax Standard format. This message syntax may use the Abstract Syntax Notation One (ASN.1) with Basic Encoding Rules (BER) and Distinguished Encoding Rules (DER) which is converted from octet (8-bit) strings to 7-bit ASCII using Base64 encoding.

In response to receiving the certificate 604 of the host system, the EPP may retrieve the public key of the initial CA from the memory of the EPP and use the retrieved public key to validate the signature on the certificate 610 of the host system. Also as discussed previously, the exemplary ATM may be operative to display a one-way hash of the public key of the host through a display device of the ATM. The ATM may require an operator to enter an input through an input device of the ATM which corresponds to a confirmation that the one-way hash number is valid. To verify the displayed one-way hash number, the operator may compare the displayed one-way hash number to another hash number that the operator independently knows corresponds to the public key of the host. If these described verifications are successful, the EPP may store the certificate of the host system 604 and/or the public key of the host in a memory of the EPP.

Also, the ATM 602 may return to the host system 606 at least one message 612 which includes data that is representative of a successful completion of the certificate transfer. Such a message 612 may include for example a solicited status message or other types of messages which an ATM is capable of sending to a host system. If the verifications of the certificate of the host system are unsuccessful, the message 612 may be returned with data representative of an error. In this described exemplary embodiment the ATM 602 may send messages 612 for each of the certificates (encipherment/decipherment or signature/verification) of the host system. In other exemplary embodiments, the ATM may request both certificates in a single message.

Figure 13:
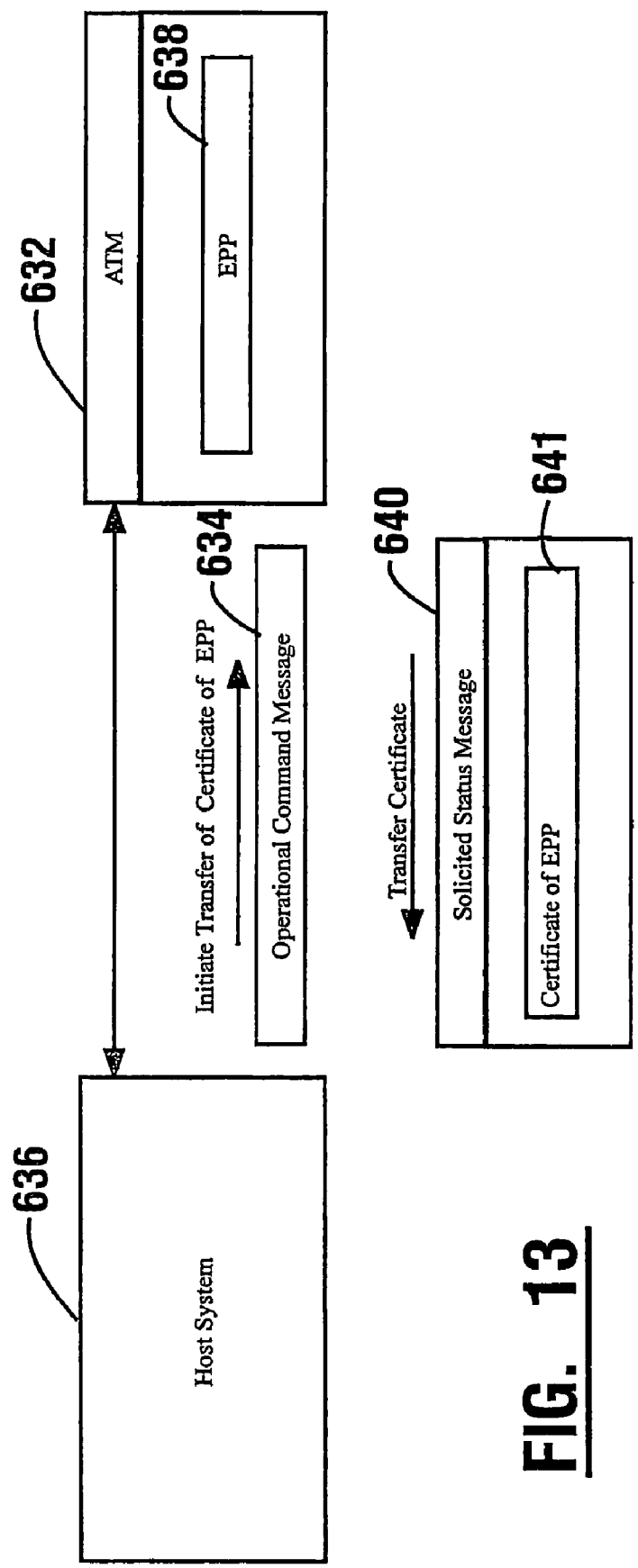
FIG. 13 schematically represents an exemplary embodiment of a system for transferring certificates of an EPP to a host system.

The EPP may also send its certificates to the host system. FIG. 13 schematically shows the certificate exchange process between an ATM 632 and a host system 636 that is initiated by the host system. Here the host system 306 may send to the ATM 632 at least one message 634 which requests one of the certificates of the EPP 638 of the ATM. Such a message 634 may include for example an operational command message or other types of messages which an ATM is capable of receiving from a host system. In a Diebold 91X ATM message protocol environment, for example, the operational command message may include a command code that corresponds to requesting a certificate. The contents of the data field may indicate which public key certificate (encipherment/decipherment or signature/verification) is requested. The ATM 632 may respond by sending at least one message 640 containing the particular certificate 641 of the EPP that was requested by the host system. Such messages 640 may include for example a solicited status message or other types of messages which an ATM is capable of sending to a host system. In a Diebold 91X ATM message protocol environment, for example, the data corresponding to the certificate may be included in the buffer data field. As discussed previously, the data corresponding to the certificate may use the PKCS #7: Cryptographic Message Syntax Standard format. The message syntax may use the Abstract Syntax Notation One (ASN.1) with Basic Encoding Rules (BER) and Distinguished Encoding Rules (DER) which is converted from octet (8-bit) strings to 7-bit ASCII using Base64 encoding.

The host system may validate the digital signature of the EPP using its copy of the public key of the initial CA. In this described exemplary embodiment the host system may send operational command messages for each of the certificates (encipherment/decipherment or signature/verification) of the EPP of the ATM. In other exemplary embodiments, the host system may request both certificates in a single request message.

Figure 14:
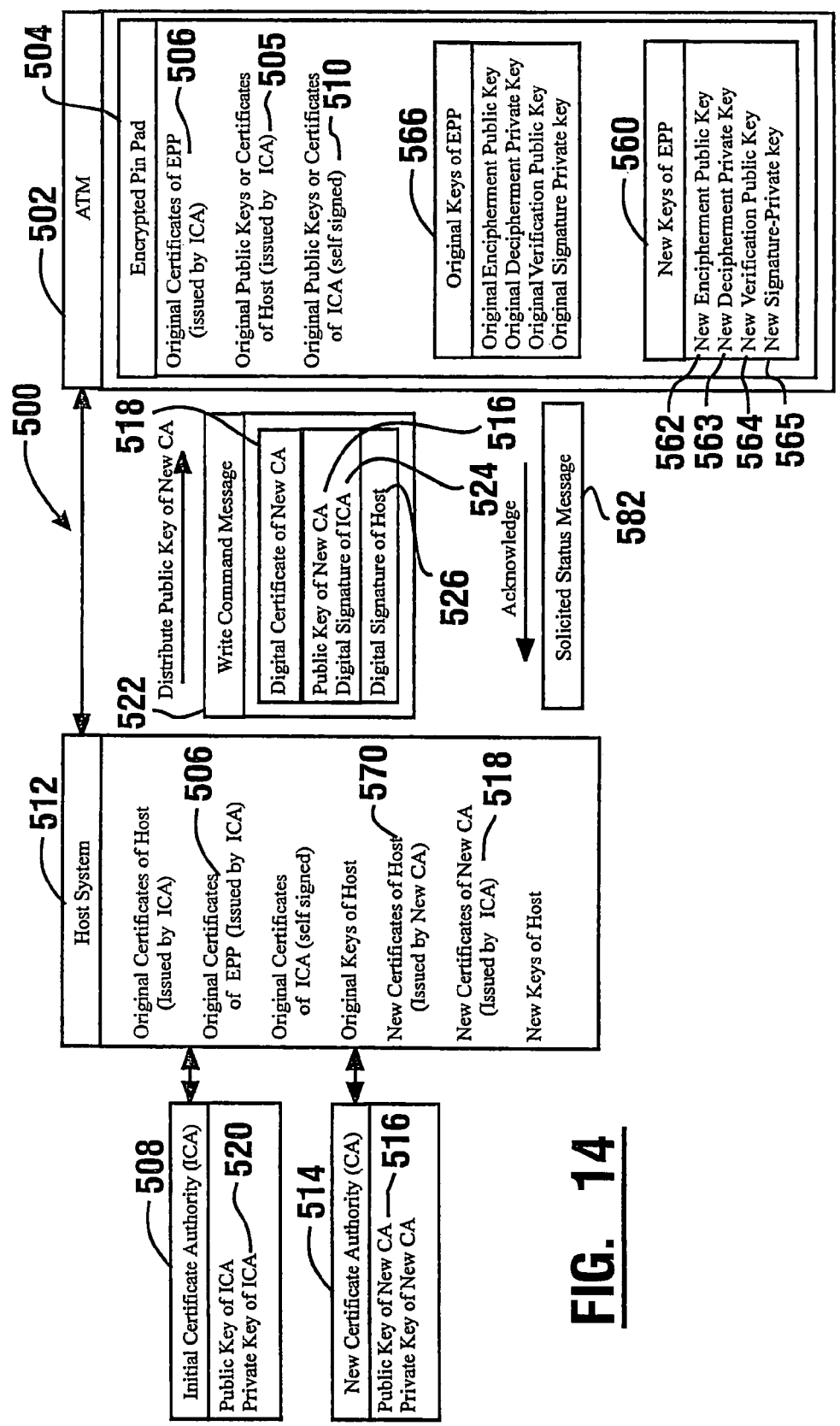
FIG. 14 schematically represents an exemplary embodiment of a system for distributing new certificate for a new certificate authority to an EPP.

As shown in FIG. 14, an exemplary embodiment of the EPP 504 may be manufactured to include the original public keys and/or original certificates 510 of an initial CA 508. As discussed previously, the EPP may further acquire its own initial set of original certificates 506 that are issued by the initial CA 508. Such original certificates may include the respective public encipherment and verification keys generated by the EPP. Also as discussed preciously, the EPP may acquire the original public keys and/or certificates 505 of the host system that were issued by the initial CA 508.

As described herein, the EPP may store copies of the certificates of host systems and certificate authorities in a memory of the EPP. However, it is to be understood that in other exemplary embodiments, only the public keys included in the certificates of certificate authorities and host systems may be stored in the EPP. Other contents of the certificates of the certificate authorities and host systems may be discarded after validation of the certificates and storage of the public keys by the EPP.

In exemplary embodiments, the original certificates 506 of the EPP which were signed by the initial CA 508 may be used for terminal master key transfers. However, the institution or other entity operating the ATM 502 with the EPP 504 may wish to replace the initial CA 508 with a new CA 514. As a result, exemplary embodiments of the EPP 504 may further be operative to replace the public keys and/or certificates of the initial CA 508 with new public keys and/or certificates of a new CA 514. FIG. 14 shows an exemplary process 500 for replacing public keys and/or certificates in an EPP 504 of an ATM 502 when the initial or subsequent CA is replaced.

In an exemplary embodiment a host system 512 may initiate the replacement of the original public keys and/or certificates 510 of the initial CA 508 stored in the EPP. An exemplary embodiment of the host system 512 may send to the ATM 502 at least one message 522 including for example a write command message or other types of messages which an ATM is capable of receiving from a host system. The message 522 may include a new certificate 518 of the new CA 514. In embodiments where the EPP requires both primary and secondary certificates of the new CA, the host system may send separate messages 522 for each certificate or may include both primary and secondary certificates in a single message. In the following description of the systems shown in FIGS. 10 and 11, each of the messages 522, 532, 540, 550 may refer to transferring only individual certificates or individual keys in the messages. However, it is to be understood that in other exemplary embodiments, the messages 522, 532, 540, 550 may be constructed to send multiple certificates or keys in each message.

In this described exemplary embodiment the new certificate 518 of the new CA 514 includes the new public key 516 of the new CA. In addition the new certificate 518 may be signed by the initial CA 508 using the private key 520 of the initial CA 508 to form the digital signature 524. In a Diebold 91X ATM message protocol environment, for example, the data corresponding to the new certificate 518 of the new CA may be included in the New Key Data field of a Write Command VII Message. As discussed previously, the data corresponding to the certificate may use the PKCS #7: Cryptographic Message Syntax Standard format. The message syntax may use the Abstract Syntax Notation One (ASN.1) with Basic Encoding Rules (BER) and Distinguished Encoding Rules (DER) which is converted from octet (8-bit) strings to 7-bit ASCII using Base64 encoding.

In the exemplary embodiment, the certificate of the new CA may be further signed by the host system 512 to form the digital signature 526. Upon receipt of the message 522 by the ATM 502, the exemplary EPP 504 is operative to validate the digital signature 524 of the initial CA and validate the digital signature 526 of the host system. In exemplary embodiments, the EPP may validate the digital signature 524 of the initial CA using the original public key and/or original certificate 510 of the initial CA. In addition the exemplary EPP 502 may validate the digital signature 526 of the host system using the original public key and/or original certificate 505 of the host system.

Once the new certificate 518 of the new CA has been validated, the new public key 516 and/or certificate 518 of the new CA may be stored in the EPP for use with authenticating new certificates issued by the new CA. Although the original public key and/or certificate 510 of the initial CA could be discarded after the new certificate 518 has been accepted, exemplary embodiments of the EPP may also retain the original public key and/or certificate 510 for use in re-commissioning the EPP.

After the new public keys 516 and/or new certificate 518 of the new CA 514 have been accepted by the EPP 504, the exemplary ATM 502 may send to the host system 512 a message 582 which indicates that the replacement of the certificates for the CA was successful. Such a message 582 may include for example a solicited status message or other types of messages which an ATM is capable of sending to a host system. When the verification of the new certificate of the CA is unsuccessful, the message 582 returned may indicate an error.

After the EPP has received the new public keys 516 of the new CA 514, the exemplary EPP 504 may require new certificates for the EPP which are signed by the new CA. To enhance security of the system, the exemplary embodiment of the EPP may also generate new public/private encipherment/decipherment and signature/validation key pairs 560 to replace the original key pairs 566.

Figure 15:
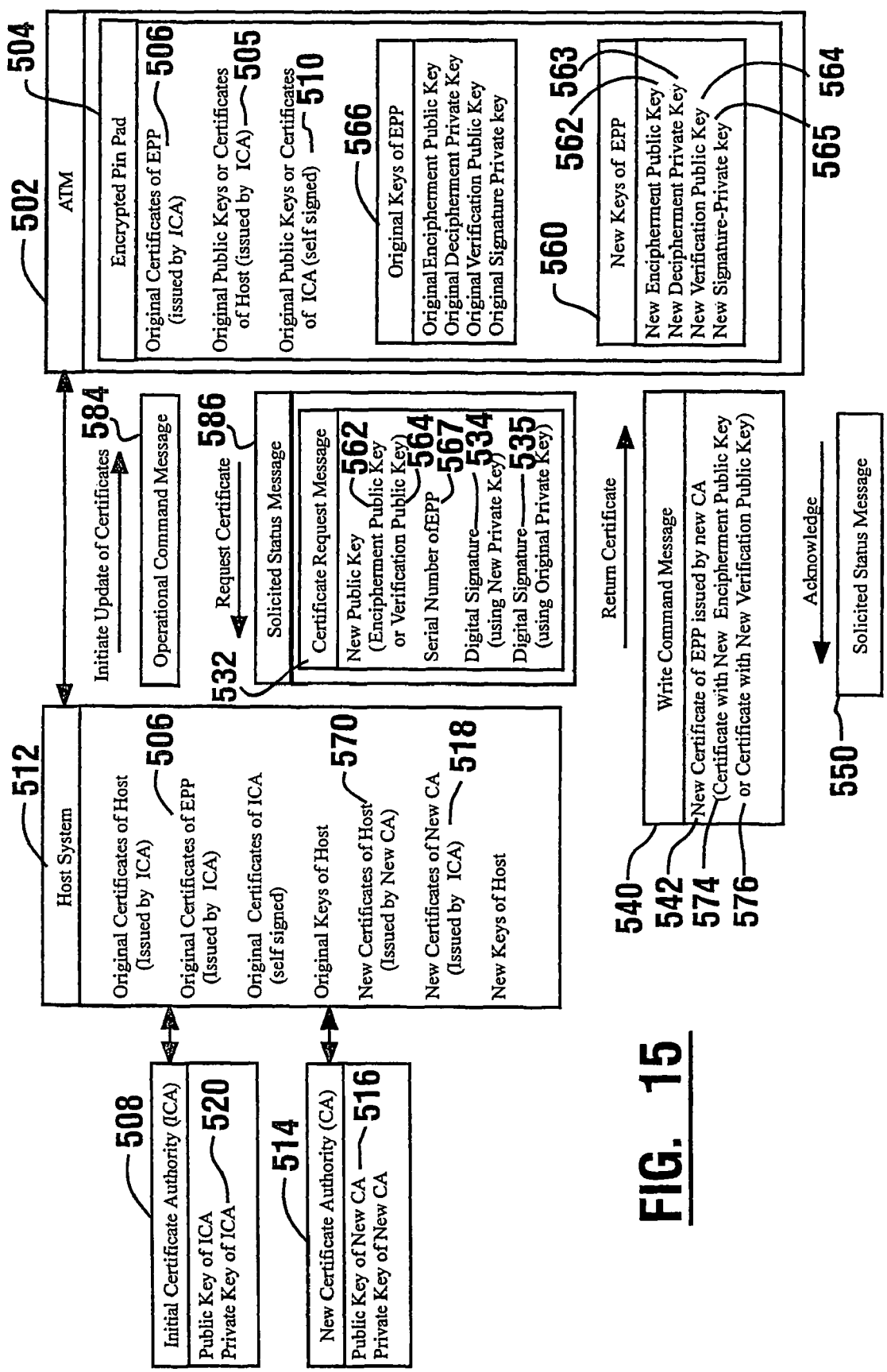
FIG. 15 schematically represents an exemplary embodiment of a system for updating original certificates of an EPP with new certificates of the EPP signed by a new certificate authority.

FIG. 15 schematically shows the process for updating the original public/private key pairs 566 of the EPP and corresponding original certificates 506 of the EPP. Here, the host system 512 may send to the ATM 502 at least one message 584 which includes data representative of a request that the EPP 504 generate new public/private key pairs 506. Such a message 584 may include an operational command message or other types of messages which an ATM is capable of receiving from a host system. In the exemplary embodiment, the message 584 may include a field which specifies which of the encipherment/decipherment or signature/verification keys pairs to update. In other exemplary embodiments, the message 584 may correspond to a request that both types of key pairs to be updated.

Once one of the new key pairs 560 has been generated, the ATM 502 may send to the host system 512 at least one message 586 which includes a certificate request message 532. Such a message 586 may include for example a solicited status message or other types of messages which an ATM is capable of sending to a host system. The certificate request message 532 may request the issue of a new certificate for one or both of the corresponding newly generated public keys 562, 564. In a Diebold 91X ATM message protocol environment, for example, the data corresponding to the certificate request message may be included in the buffer data field of the solicited status message.

The exemplary certificate request message 532 may include one or both of the corresponding newly generated public key 562, 564 of the EPP 504. The certificate request messages 532 may also include the serial number 567 or other unique identifier of the EPP. In this described exemplary embodiment, the new public verification key 564 and the new public encipherment key 562 are sent to the host system in separate certificate request messages responsive to receiving separate messages 584 from the host which individual specify which of the key pairs to update. However, it is to be understood that in alternative exemplary embodiments, both public keys 562, 564 may be sent in a common certificate request message or the message 586 from the ATM may include separate certificate request messages for each public key.

When the certificate request message contains the new verification public key 564, the EPP may sign the certificate request message 532 with the new private signature key 565 to form digital signature 534. Also to authenticate the message to the host, the EPP may sign the certificate request 532 with its original private signature key of the original keys 566 to form the digital signature 535. When the certificate request message contains the new encipherment public key 562 of the EPP, the certificate request message may first be signed with the new decipherment private key 563, and may then be signed with the original decipherment private key from the original keys 566 to authenticate the message with the host.

In an exemplary embodiment the certificate request message 532 may include both the PKCS #10: Certification Request Syntax Standard format and the PKCS #7: Cryptographic Message Syntax Standard format. The messages may use the PKCS #7 Signed-data content for the outer signature (using the original private signatureor decryption key). The message may use the PKCS #10 certificate request format for the inner data (using the new private signature or decryption key). Also as discussed previously, the message syntax may use the Abstract Syntax Notation One (ASN.1) with Basic Encoding Rules (BER) and Distinguished Encoding Rules (DER) which is converted from octet (8-bit) strings to 7-bit ASCII using Base64 encoding.

Upon receipt of the certificate request messages 532, the exemplary host system may validate the EPP signatures 534, 535 of the messages. After validating the signatures 534, 535, the host system may cause the new CA 514 to issue an updated certificate 542 which includes the corresponding new public key 562, 564 of the EPP received in the certificate request message 532. The updated certificate 542 may also include the serial number 567 or other unique identifier of the EPP.

The host system may be operative to send a message 540 to the ATM 502 which includes the updated certificate 542. Such a message 540 may include for example write command messages or other types of messages that an ATM is capable of receiving from a host system. In a Diebold 91X ATM message protocol environment, for example, the data corresponding to the updated certificate 542 for the EPP may be included in the new key data field of a Write Command VII Message. In an exemplary embodiment the messages 540 for sending an updated certificate of the EPP may include the PKCS #7: Cryptographic Message Syntax Standard format. The messages may use the degenerate "certificate only" case of the Signed-data content type in which the inner content's data field is omitted and there are no signers.

The exemplary embodiment of the host system is operative to send at least one message 540 with one new certificate 542 of the EPP for each certificate request messages 532. In alternative exemplary embodiments, the host system may send both the new encipherment/decipherment and signature/verification certificates 574, 576 in a single message 540 responsive to receiving one or more certificate request messages 522 that includes both public keys 562, 564 in a single message 586 from the ATM.

Before accepting the new certificate 542, the EPP may verify that the new certificate was signed by the current CA, which in this described embodiment is the new CA 514. In addition the EPP may verify that the public key in the new certificate 542 matches the current public key which in this described embodiment is one of the newly generated public keys 562, 564. Also the EPP may verify that the serial number in the new certificate 542 matches the original serial number of the EPP. If the received new certificate is determined to be valid, the EPP may store it in the memory of the EPP. In addition the EPP may replace the original keys 566 with the newly generated public/private encipherment/decipherment or signature/validation key pairs 560 that correspond to the new certificate 542.

Upon accepting the new certificate 542, the exemplary EPP may return to the host system at least one message 550 which indicates that the new certificate 542 was successfully received. Such a message 550 may include for example a solicited status message 550 or other types of message which an ATM is capable of sending to a host system. In one exemplary embodiment, when the message 550 has been received and represents the acceptance of the new certificate 542, the host system may replace the copy of the original certificate 506 of the EPP stored at the host system with the new certificate 542 of the EPP. In other exemplary embodiments, the original ATM certificates 506 stored at the host system may be replaced with new certificates 542 of the EPP by having the EPP of the ATM 504 send the new certificates to the host system. As discussed previously with respect to FIG. 13, the host system 536 may send a message 634 to the ATM 632 which requests one of the new certificates of the EPP. In response, the EPP 638 may return the requested new certificate in a message 640.

In addition, the exemplary host system 512 may further send to the EPP, a set of new certificates 570 for the host system which are digitally signed by the new CA. This process may be initiated by the host system or an operator at the ATM. As discussed previously with respect to FIG. 12, when an operator initiates the transfer of the updated certificate of the host system to the ATM 502, the ATM is operative to output a one-way hash of the new public key contained in the new certificate of the host through a display device of the ATM which can be independently verified by the operator. If the one-way hash is indicated to be valid by the operator, the EPP may accept and store the new public key and/or the new certificate of the host system in the memory of the EPP.

As with the certificates issued by the initial CA, the EPP 504 and host system 512 are further operative to use the exchanged new public keys and/or new certificates 542, 570 issued by the new CA to perform the steps involved with securely transferring a terminal master key from the host system 512 to the EPP 504. In the exemplary embodiment, the steps described with respect to updating the CA and certificates may be performed a plurality of times whenever there is a requirement to change the CA and/or the public keys associated with the CA.

In exemplary embodiments, the EPP may be decommissioned in the field. Such a decommissioning may include clearing the public and private key pairs of the EPP and any public keys of the host system and a new CA. When the EPP is re-commissioned it may generate new public and private key pairs. The EPP may then generate new certificate request messages to be sent to the initial CA which include the newly generated public keys and the serial number of the EPP. As discussed previously, the initial CA may issue corresponding primary and secondary certificates for each of the new public keys of the EPP.

Computer software used in operating the automated transaction machines and connected computers may be loaded from articles of various types into the respective computers. Such computer software may be included on and loaded from one or more articles such as diskettes or compact disks. Such software may also be included on articles such as hard disk drives, tapes or ready only memory devices. Other articles which include data representative of the instructions for operating computers in the manner described herein are suitable for use in achieving operation of transaction machines and systems in accordance with exemplary embodiments.

The exemplary embodiments of the automated banking machines and systems described herein have been described with reference to particular software components and features. Other embodiments may include other or different software components which provide similar functionality.

Thus the new automated banking machine and system and method achieves one or more of the above stated objectives, eliminates difficulties encountered in the use of prior devices and systems, solves problems and attains the desirable results described herein.

In the foregoing description certain terms have been used for brevity, clarity and understanding. However no unnecessary limitations are to be implied therefrom because such terms are for descriptive purposes and are intended to be broadly construed. Moreover the descriptions and illustrations herein are by way of examples and the invention is not limited to the details shown and described.

In the following claims any feature described as a means for performing a function shall be construed as encompassing any means capable of performing the recited function and shall not be deemed limited to the particular means shown in the foregoing description or mere equivalents thereof. The description of the exemplary embodiment included in the Abstract included herewith shall not be deemed to limit the invention to features described therein.

Having described the features, discoveries and principles of exemplary embodiments, the manner in which it is constructed and operated and the advantages and useful results attained; the new and useful structures, devices, elements, arrangements, parts, combinations, systems, equipment, operations, methods, processes and relationships are set forth in the appended claims.

We claim:

1. Apparatus comprising:
 a card activated cash dispensing automated banking machine,
 wherein the automated banking machine includes at least one card reader device operative to read a card provided by a user of the machine,
 wherein the automated banking machine includes a cash dispenser,
 wherein the automated banking machine includes an encrypting pin pad (EPP), wherein the EPP includes at least one processor and a first private asymmetric key stored in the EPP,
 wherein the automated banking machine is operative to send at least one first message to a host banking system, wherein the at least one first message includes first data representative of a request to transfer a terminal master key to the automated banking machine, wherein the automated banking machine is operative to receive at least one second message from the host banking system, wherein the at least one second message includes an encrypted terminal master key, wherein the at least one processor of the EPP is operative to validate at least portions of the second message, wherein the at least one processor of the EPP is operative to decrypt the terminal master key with the first private asymmetric key using an asymmetric encryption algorithm, wherein the at least one processor of the EPP is operative to store the terminal master key in the EPP for use with decrypting at least one further key received from the host banking system.

2. The apparatus according to claim 1, wherein the automated banking machine is operative to receive at least one message from the host banking system, wherein the at least one message includes a command to initiate a transfer of a terminal master key to the automated banking machine, wherein the automated banking machine is operative to send the at least one first message to the host banking system responsive to the at least one third message.

3. The apparatus according to claim 2, wherein the third message corresponds to an operational command message, wherein the first message corresponds to a solicited status message.

4. The apparatus according to claim 1, wherein the first message corresponds to an unsolicited status message, wherein the second message corresponds to a write command message.

5. The apparatus according to claim 1, wherein the at least one processor of the EPP is operative to determine that the terminal master key is a double-length key, wherein the at least one processor of the EPP is operative to configure a current encryption algorithm that is used by the at least one processor of the EPP to encrypt data, from a Single-DES encryption algorithm to a double-length Triple-DES encryption algorithm responsive to determining that the terminal master key is a double-length key.

6. The apparatus according to claim 1, wherein the at least one processor of the EPP is operative to generate at least one pair of keys, wherein the at least one pair of keys includes a public key of the EPP and a private key of the EPP, wherein the private key of the EPP corresponds to the first private asymmetric key, wherein the at least one processor of the EPP is operative to encrypt a personal identification number (PIN) inputted through the EPP using the at least one further key received from the host banking system, wherein the at least one processor of the EPP is operative to store the public key of the EPP and the private key of the EPP in a memory of the EPP, wherein the at least one processor of the EPP is operative to generate at least one certificate request message with the EPP, wherein the certificate request message includes the public key of the EPP, wherein the at least one processor of the EPP is operative to output the certificate request message from the EPP, wherein the EPP is operative to receive at least one EPP certificate signed by a certificate authority (CA), wherein the EPP certificate includes the public key of the EPP, wherein the at least one processor of the EPP is operative to receive at least one certificate of the CA signed by the CA, wherein the certificate of the CA includes a public key of the CA, wherein the at least one processor of the EPP is operative to store the EPP certificate and the public key of the CA in the memory of the EPP.

7. The apparatus according to claim 6, wherein the public key of the CA corresponds to an original public key of an initial CA, wherein the EPP includes the original public key of the initial CA and at least one original public key of the host banking system, wherein the at least one processor of the EPP is operative to validate the first message using the original public key of the host banking system, wherein the automated banking machine is operative to receive a new certificate of a new CA from the host banking system, wherein the new certificate of the new CA includes a new public key of the new CA, wherein the new certificate of the new CA is signed by the initial CA, wherein the new certificate of the new CA is further signed by the host banking system, wherein the at least one processor of the EPP is operative to validate the digital signature of the initial CA included with the new certificate of the new CA using the original public key of the initial CA, wherein the at least one processor of the EPP is operative to validate a digital signature of the host banking system included with the new certificate of the new CA using the at least one original public key of the host banking system, wherein the at least one processor of the EPP is operative to store the new public key of the new CA in the EPP.

8. Apparatus comprising:
   a card activated cash dispensing automated banking machine,
      wherein the automated banking machine includes a card reader, a cash dispenser, and an encrypting pin pad (EPP),
      wherein the automated banking machine reads card data corresponding to financial accounts from user cards with the card reader,
      wherein the EPP includes at least one processor, wherein the EPP includes a first private asymmetric key stored in the EPP,
      wherein the automated banking machine includes at least one computer in operative connection with the card reader, the cash dispenser, and the EPP,
      wherein the at least one computer is operatively configured to send at least one first message to a host banking system, wherein the at least one first message includes first data representative of a request to transfer a terminal master key to the automated banking machine, wherein the at least one computer is operatively configured to receive at least one second message from the host banking system, wherein the at least one second message includes an encrypted terminal master key, wherein the at least one processor of the EPP is operatively configured to validate at least portions of the at least one second message, wherein the at least one processor of the EPP is operatively configured to decrypt the terminal master key with the first private asymmetric key of the EPP using an asymmetric encryption algorithm, wherein the at least one processor of the EPP is operatively configured to store the terminal master key in the EPP for use with decrypting at least one further key received from the host banking system.

* * * * *